United States Patent
Sewell et al.

(10) Patent No.: US 7,298,841 B2
(45) Date of Patent: Nov. 20, 2007

(54) STEGOTEXT ENCODER AND DECODER

(75) Inventors: Roger Fane Sewell, Cambridge (GB); Mark St. John Owen, Cambridge (GB); Stephen John Barlow, Cambridge (GB); Simon Paul Long, Cambridge (GB)

(73) Assignee: Activated Content Corporation, Seattle, WA (US)

( * ) Notice: Subject to any disclaimer, the term of this patent is extended or adjusted under 35 U.S.C. 154(b) by 771 days.

(21) Appl. No.: 10/343,145

(22) PCT Filed: Jul. 27, 2001

(86) PCT No.: PCT/GB01/03391

§ 371 (c)(1), (2), (4) Date: Aug. 28, 2003

(87) PCT Pub. No.: WO02/11326

PCT Pub. Date: Feb. 7, 2002

(65) Prior Publication Data

US 2004/0028222 A1 Feb. 12, 2004

(30) Foreign Application Priority Data

Jul. 27, 2000 (GB) ............................. 0018487.9
Jul. 27, 2000 (GB) ............................. 0018489.5
Jul. 27, 2000 (GB) ............................. 0018491.1

(51) Int. Cl.
*H04L 1/08* (2006.01)
*H04L 9/34* (2006.01)
*H04L 9/16* (2006.01)

(52) U.S. Cl. .................... 380/43; 380/210; 713/161

(58) Field of Classification Search ............... 380/210, 380/43; 713/161
See application file for complete search history.

(56) References Cited

U.S. PATENT DOCUMENTS 6,373,970 B1 * 4/2002 Dong et al. ................. 382/128
6,529,927 B1 * 3/2003 Dunham ..................... 708/400

(Continued)

FOREIGN PATENT DOCUMENTS

EP       0 766 468 A2      4/1997

(Continued)

*Primary Examiner*—Gilberto Barrón, Jr.
*Assistant Examiner*—Venkat Perungavoor
(74) *Attorney, Agent, or Firm*—Blakely, Sokoloff, Taylor & Zafman; Stephen M. De Klerk

(57) ABSTRACT

The invention comprises an encoder for encoding a stegotext and a decoder for decoding the encoded stegotext, the stegotext being generated by modulating the log power spectrogram of a covertext signal with at least one key, the or each key having been added or subtracted in the log domain to the covertext power spectrogram in accordance with the data of the watermark code with which the stegotext was generated, and the modulated power spectrogram having been returned into the original domain of the covertext. The decoder carries out Fast Fourier Transformation and rectangular polar conversion of the stegotext signal so as to transform the stegotext signal into the log power spectrogram domain; subtracts in the log power domain positive and negative multiples of the key or keys from blocks of the log power spectrogram and evaluates the probability of the results of such subtractions representing an unmodified block of covertext in accordance with a predetermined statistical model.

18 Claims, 23 Drawing Sheets

U.S. PATENT DOCUMENTS 6,766,062 B1 * 7/2004 Donoho et al. ............. 382/240

FOREIGN PATENT DOCUMENTS

| EP | 0 905 967 A1 | 3/1999 |
| EP | 1037442 A2 * | 9/2000 |
| WO | WO 97/33391 | 9/1997 |
| WO | WO 00/04662 | 1/2000 |

* cited by examiner

SYSTEM OVERVIEW

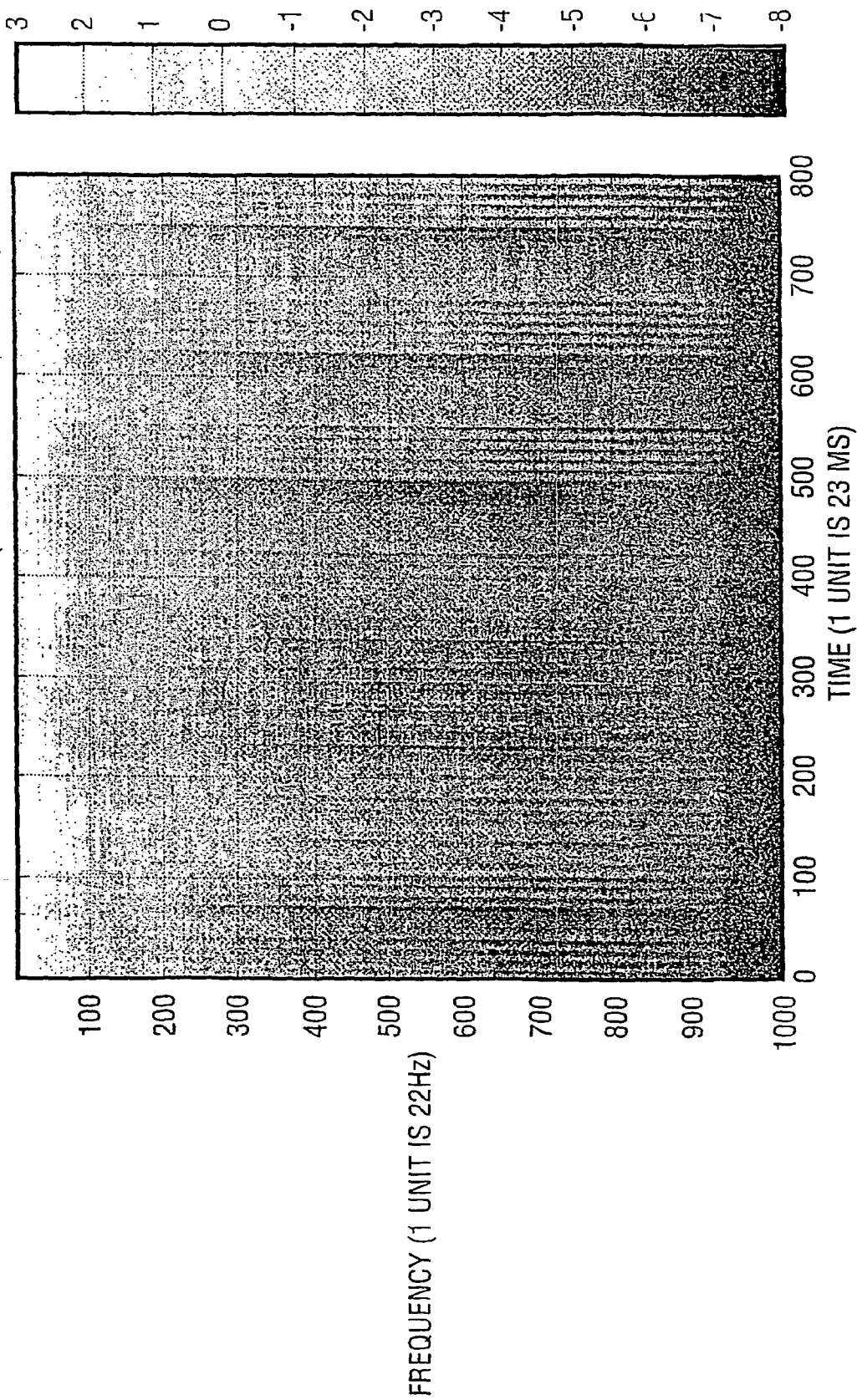

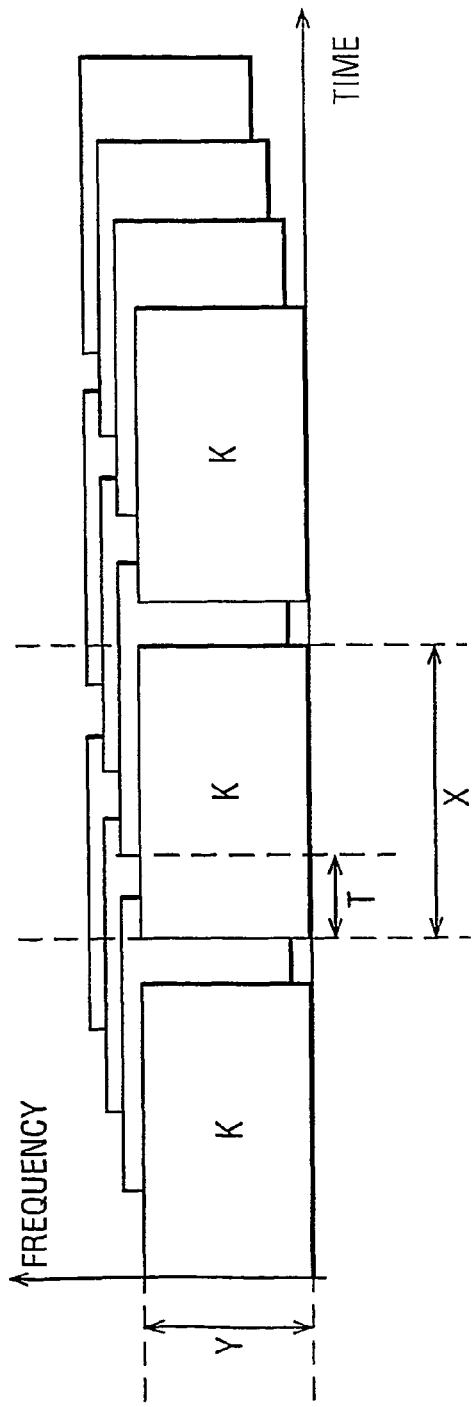
FIG. 4 OVERLAPPING MODULATION PATTERNS
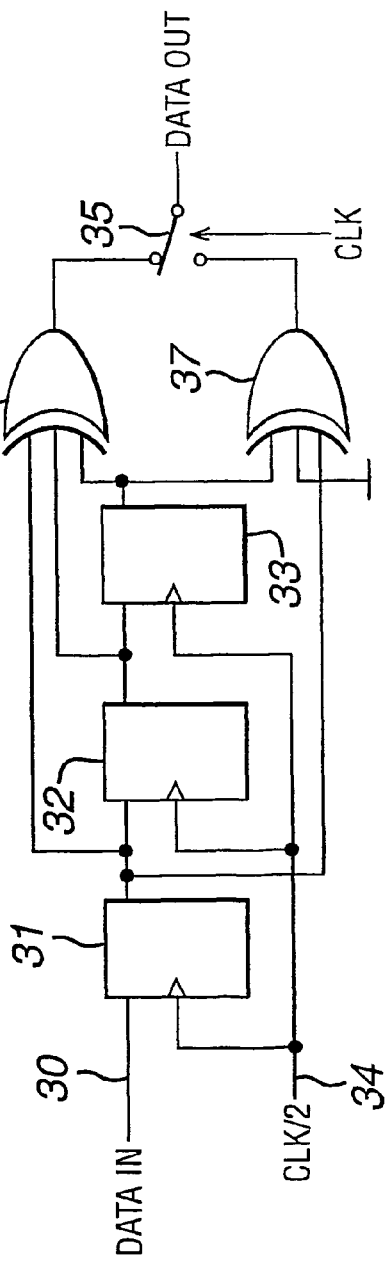
FIG. 5 CONVOLUTIONAL ENCODER MODIFICATION OF POWER SPECTROGRAM USING WINDOWED FFTs

*KEY GENERATION FILTER PARAMETERS*

*FILTER CHARACTERISTICS OF CONSECUTIVE KEYS*

ONE-DIMENSIONAL WHITE NOISE SIGNAL
WITH SWEPT BAND-PASS FILTER

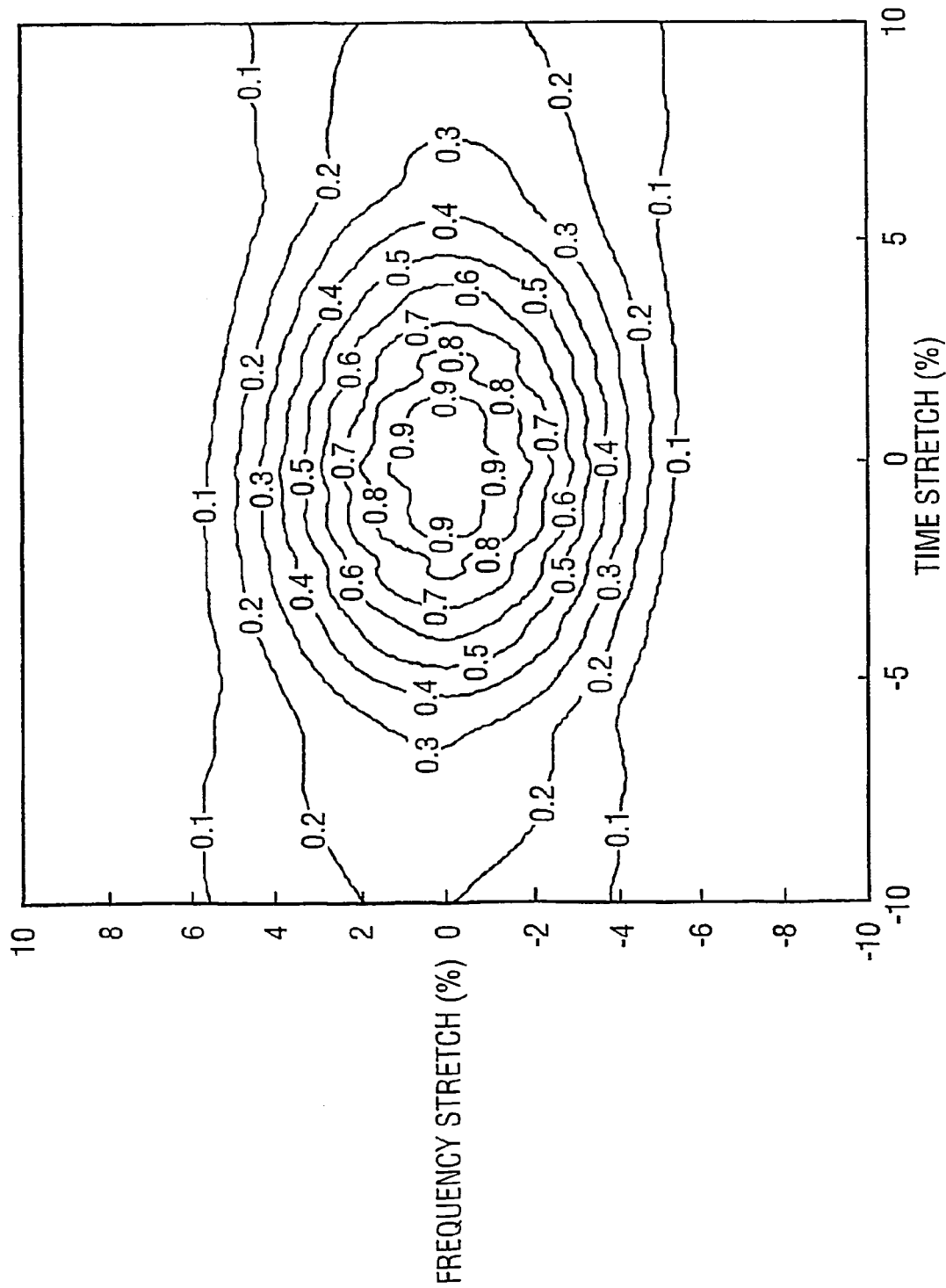
FIG. 12 EFFECT OF TIME AND FREQUENCY STRETCH ON AMPLITUDE OF CORRELATION PEAK

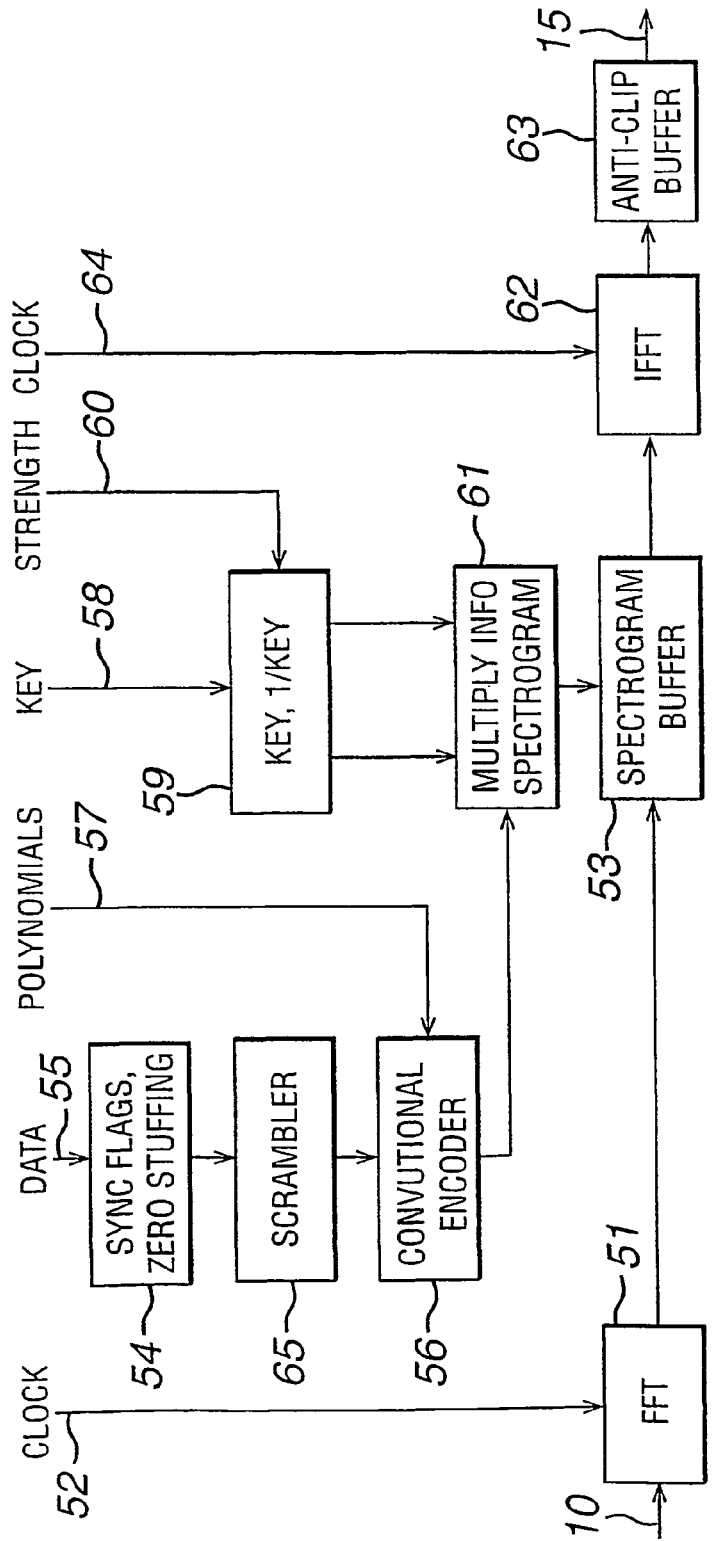
FIG. 13 ENCODER BLOCK DIAGRAM
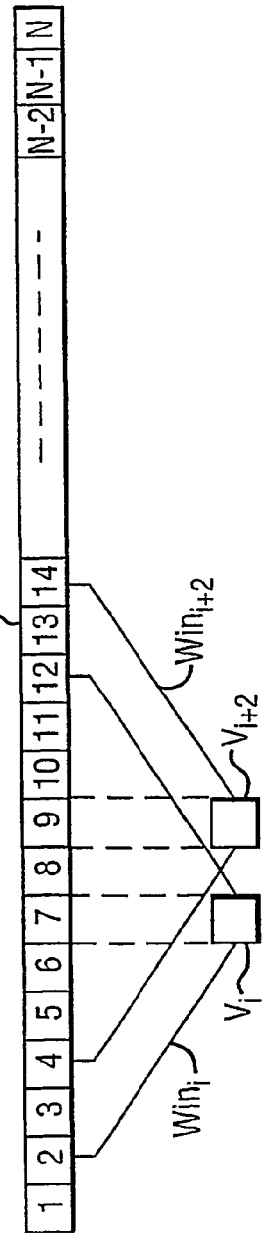
FIG. 19

GAUSSIAN NOISE OF VARIANCE 1

STUDENT NOISE WITH m=1 AND SCALED TO VARIANCE=1

FIG. 16
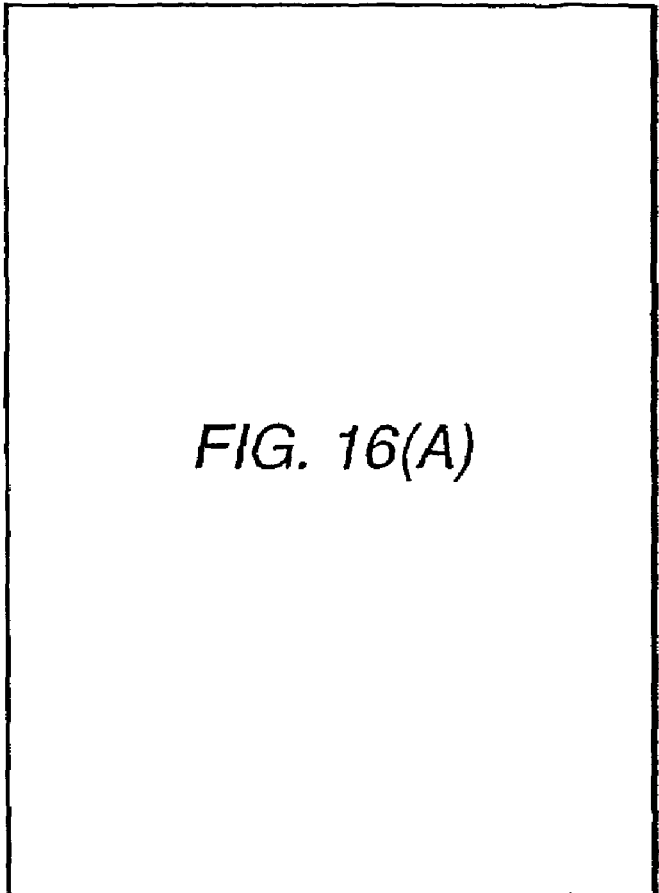
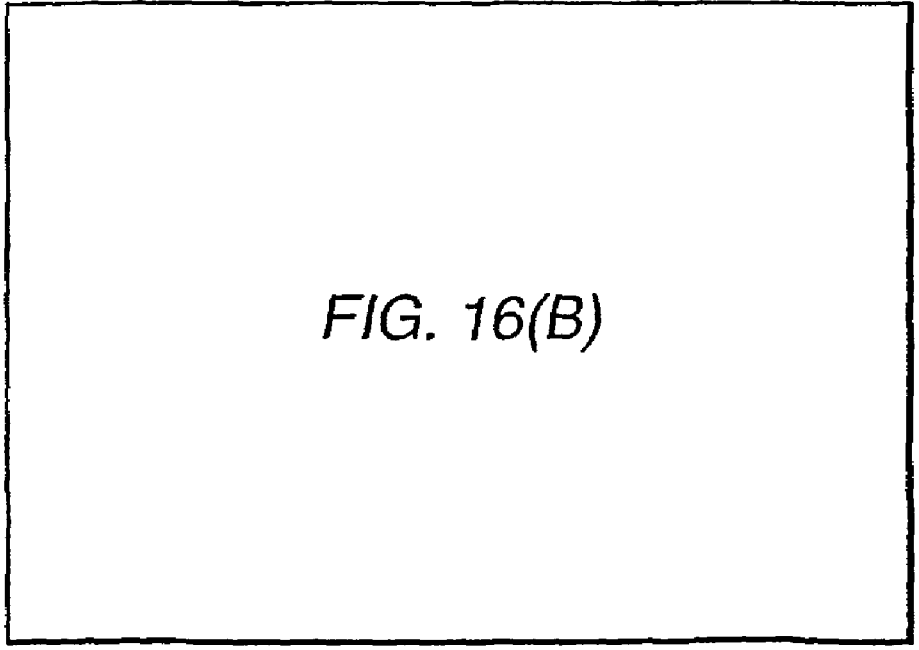

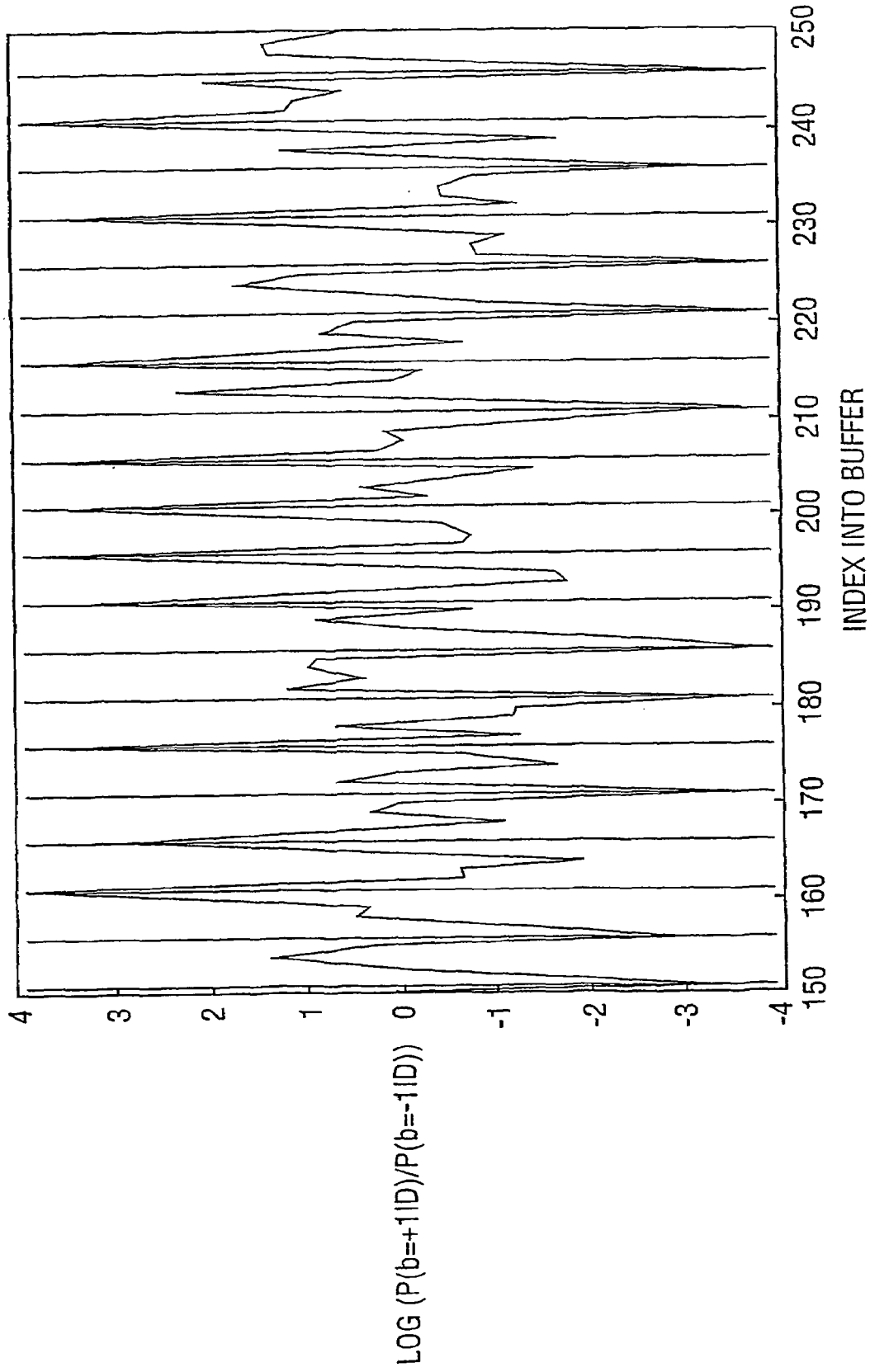

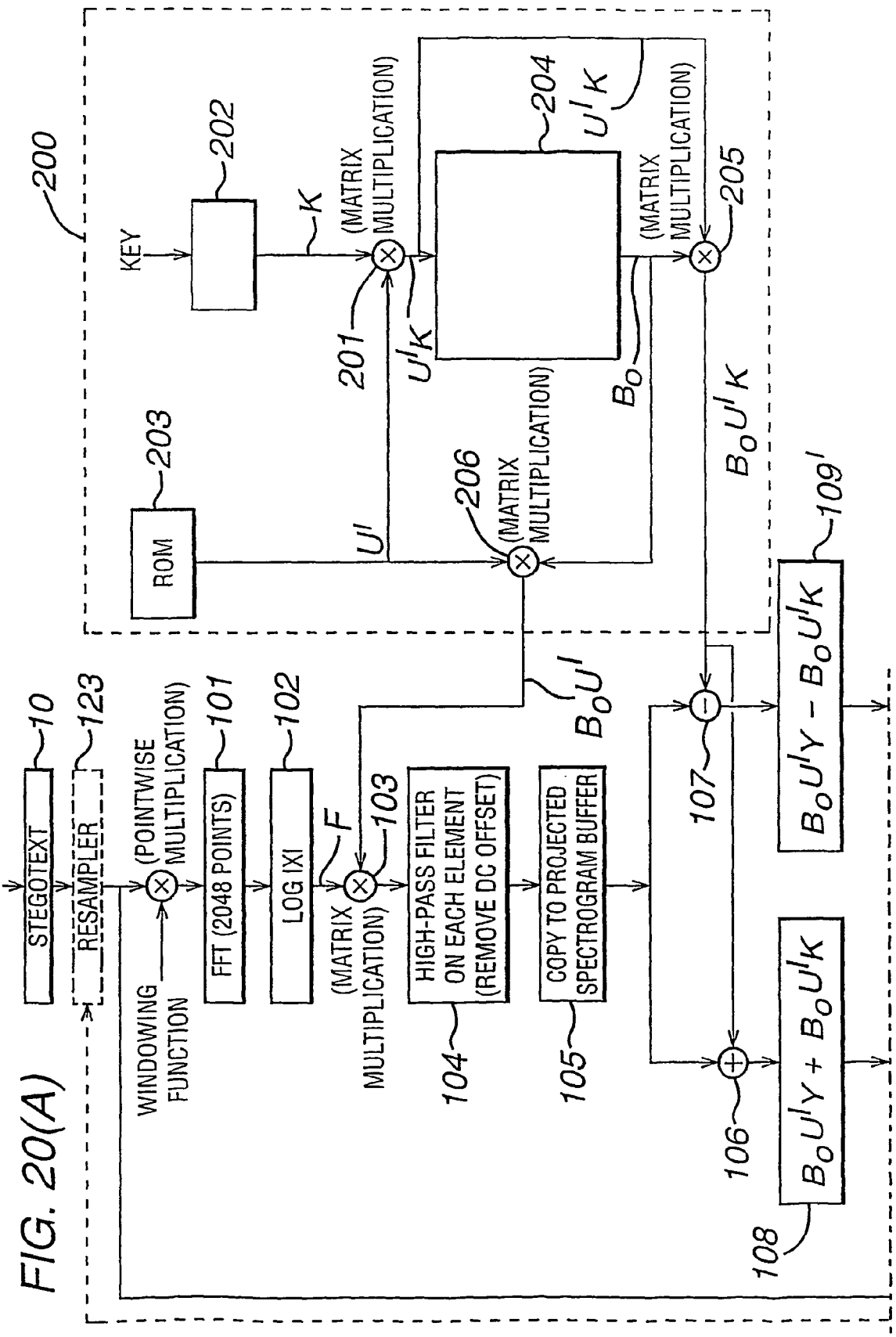

STEGOTEXT ENCODER AND DECODER

This Application is a National Phase of International Application No. PCT/GB01/03391, filed on Jul. 27, 2001, which I claims priority from Great Britain Patent Application No. 0018491.1, filed on Jul. 27, 2000; Great Britain Patent Application No. 0018489.5, filed on Jul. 27, 2000; and Great Britain Patent Application No. 0018487.9, filed on Jul. 27, 2000.

The present invention concerns watermarking analog or digital signals. It will be appreciated that whilst the signals may be video or data signals the present invention is particularly, though not exclusively, concerned with watermarking audio signals.

The term "watermarking" is intended to cover the procedure of adding data to a main signal so that the added data does not affect the main purpose of the main signal. The main signal is often referred to a "covertext" and the signal with the added watermarking data is often referred to as a "stegotext". Thus in the case of an audio signal the presence of the added data in the stegotext is intended to be virtually imperceptible to a listener when the stegotext is reproduced. However the presence of the added data in the stegotext enables, if the user has the appropriate decoding equipment, to identify the origin of the covertext. If the user's equipment is provided with suitable circuitry he or she may be prevented from reproducing the main data carried in the original covertext signal if the watermark data recovered does not match the equipment. Additionally a user has to be able to reproduce a covertext.

Such techniques obviously have great potential with regard to musical recordings. As a result a substantial amount of effort has been put into the problem of watermarking audio signals in such a manner that a person who is entitled to listen to the stegotext does not have his or her enjoyment impaired by spurious sounds caused by the added coded data.

Alternatively it is important that the watermarking should be sufficiently robust both to remain effective after the various types of conventional signal processing to which recorded and transmitted audio material can be subjected and also to be able to resist direct attempts to eliminate or render ineffective the added coded data.

An apparatus and method for watermarking analog signals is disclosed in International Patent Specification No. WO98/53565, and this specification discloses a number of the techniques which have been employed to watermark signals.

One method of watermarking proposed in this prior published specification involves measuring the short-term autocorrelation function of the audio signal and then adding an additional signal which is hard to hear and which changes the value of the short-term autocorrelation function at some specific delay or delays to produce a specific waveform which carries data at a low rate. The actual modulation of the data on to this waveform can be done by using any of a number of suitable modulation techniques. At the reception end of the apparatus a watermark reader (or decoder) measures the short-term auto correlation function of the stegotext and applies a demodulation appropriate to the modulation technique used. Provided that the reader can utilise the data which was initially used to modulate the autocorrelation function the added coded data can be removed from the stegotext.

However the short-term autocorrelation function of many audio signals can be easily altered to be arbitrarily close to zero at arbitrarily long delays without altering the sound of the basic audio. It is accordingly possible to attack the watermarked signal in a relatively simple manner so as to nullify the effect of the watermarking.

The present invention is concerned with providing a watermarking system which is not subject to the above defect and also to provide a decoder for decoding watermarked signals.

In accordance with a first aspect of the invention there is provided an encoder for encoding a covertext signal to generate a stegotext, the encoder comprising:

first transformation means for carrying out a Fast Fourier Transform and rectangular polar conversion of the covertext signal so as to transform the covertext signal into a log power spectrogram;

means for providing at least one key, the or each key being in the form of a two-dimensional pattern of predetermined size;

a multiplier for adding or subtracting in the log power spectrogram domain multiples of the key or multiples of one or more of the keys if there is a plurality of keys, to blocks of the transformed covertext signal;

means for controlling the addition or subtraction of the key or keys by the multiplier in accordance with data representing a desired code; and second transformation means for carrying out polar rectangular conversion and inverse Fast Fourier Transformation of the modulated covertext signal to generate a stegotext.

In accordance with a second aspect of the invention there is provided a method claim of encoding a covertext signal to generate a stegotext, the method comprising:

carrying out a Fast Fourier Transform and rectangular polar conversion of the covertext signal so as to transform the covertext signal into the power spectrogram domain;

providing at least one key, the or each key being in the form of a 2-dimensional pattern of predetermined size;

adding or subtracting in the log power spectrogram domain multiples of the key or multiples of one or more of the keys if there is a plurality of keys, to segments of the transformed covertext signal;

controlling the addition or subtraction of multiples of the key or keys at the addition/multiplication step in accordance with data representing a desired code; and carrying out polar rectangular conversion and inverse Fast Fourier Transform of the modulated covertext signal to generate a stegotext.

In accordance with a third aspect of the invention there is provided a decoder for decoding a stegotext generated by modulating the log power spectrogram of a covertext signal with at least one key (K), multiples of the or each key having been added or subtracted in the log domain to the covertext power spectrogram in accordance with the data of the watermark code with which the stegotext was generated, and returning the modulated power spectrogram into the original domain of the covertext the decoder comprising: transformation means for carrying out Fast Fourier Transformation and rectangular polar conversion of the stegotext signal so as to transform the stegotext signal into the log power spectrogram domain; means for providing the key or keys with which the original log power spectrogram of the covertext signal was encoded; calculation means for subtracting in the log power domain positive and negative multiples of the key or keys from blocks of the log power spectrogram and evaluating the probability of the results of such subtractions representing an unmodified block of covertext in accordance with a predetermined statistical model; and extraction means for recovering the encoded data from the output of the calculation means.

In accordance with a fourth aspect of the invention there is provided a method of decoding a stegotext generated by modulating the power spectrogram of a covertext signal with at least one key (K), multiples of the key or keys having been added or subtracted in the log domain to the covertext power spectrogram in accordance with the data of the watermark code with which the stegotext was generated and the modulated power spectrogram having been returned to the original domain of the covertext, the method comprising: carrying out Fast Fourier Transformation and rectangular polar conversion of the stegotext signal so as to transform the stegotext signal into the log power spectrogram domain; providing the key or keys with which the log power spectrogram of the original covertext signal was encoded; subtracting in the log power domain positive and negative multiples of the key or keys from blocks of the log power spectrogram and evaluating the probability of the results of such subtractions representing an unmodified block of covertext in accordance with a predetermined statistical model; and recovering the encoded data from the output of the calculation means.

In accordance with a fourth aspect of the invention there is provided a watermark key generator as set out in claim 45.

In order that the present invention may be more readily understood embodiments thereof will now be described by way of example and with reference to the accompanying drawings, in which:

FIG. 3 is an illustration of the power spectrum of a segment of music;

FIG. 4 is a diagram illustrating the overlapping of modulation patterns when the power spectrogram is modified;

FIG. 5 is a block diagram of a convolution encoder;

FIG. 12 is a graph illustrating the effects of stretch on correlation;

FIG. 13 is a block diagram of one embodiment of an encoder in accordance with the present invention;

FIG. 18 is a graph indicating the result of processing the values indicated in FIG. 17;

FIG. 19 is a diagram illustrating the operation of a maximum-likelihood convolutional-code decoder which forms part of the decoders of FIGS. 16 and 20;

Figure 1:
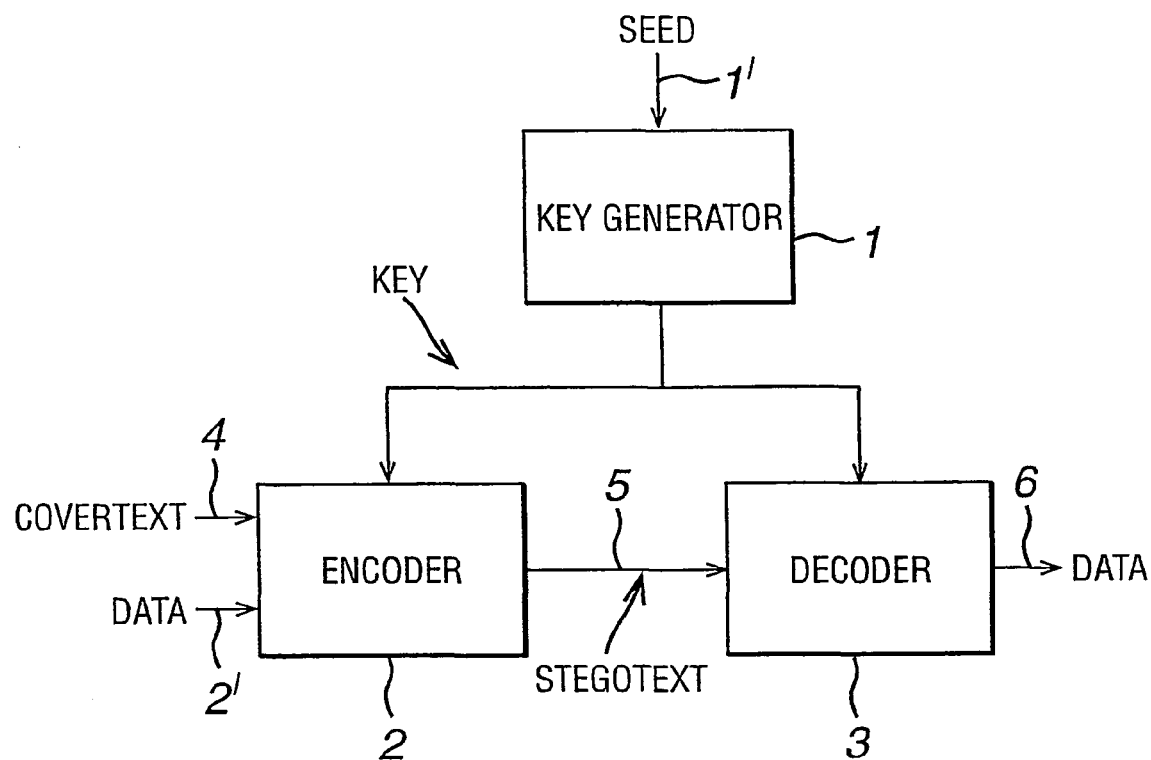
FIG. 1 is a block diagram of a system for encoding and decoding a covertext signal with additional data so as to generate a stegotext.

Referring now to FIG. 1 the basic system consists of a key generator (1), an encoder (2) and a decoder (3). The key generator (1) produces a pseudo-random key based on an integer seed value input at (1'). The encoder (2) marks a music file input at (4) as a cover text with data using the key to generate a stegotext. The data is input into the encoder (2) at (2'). The decoder (3), receiving the stegotext, over a transmission line (5), reads back the data from a marked file again using the key and outputs the recovered data at (6). The same key must be used in the encode and decode operations to ensure that the data are read back correctly. The key can, of course, be regenerated when needed from the seed, so the seed value is all that is required to decode a marked file. The transmission line (5) can, of course, take a wide variety of forms. Thus the stegotext could be recorded on any suitable medium or transmitted by radio, fibre cables or the like. Hereinafter any unmarked file will be referred to as the covertext and a watermarked file as the stegotext. Whilst the present embodiment is described in relation to its use with music it will be appreciated that the techniques and apparatus described can be used in non-musical situations such as speech or video data.

Figure 2:
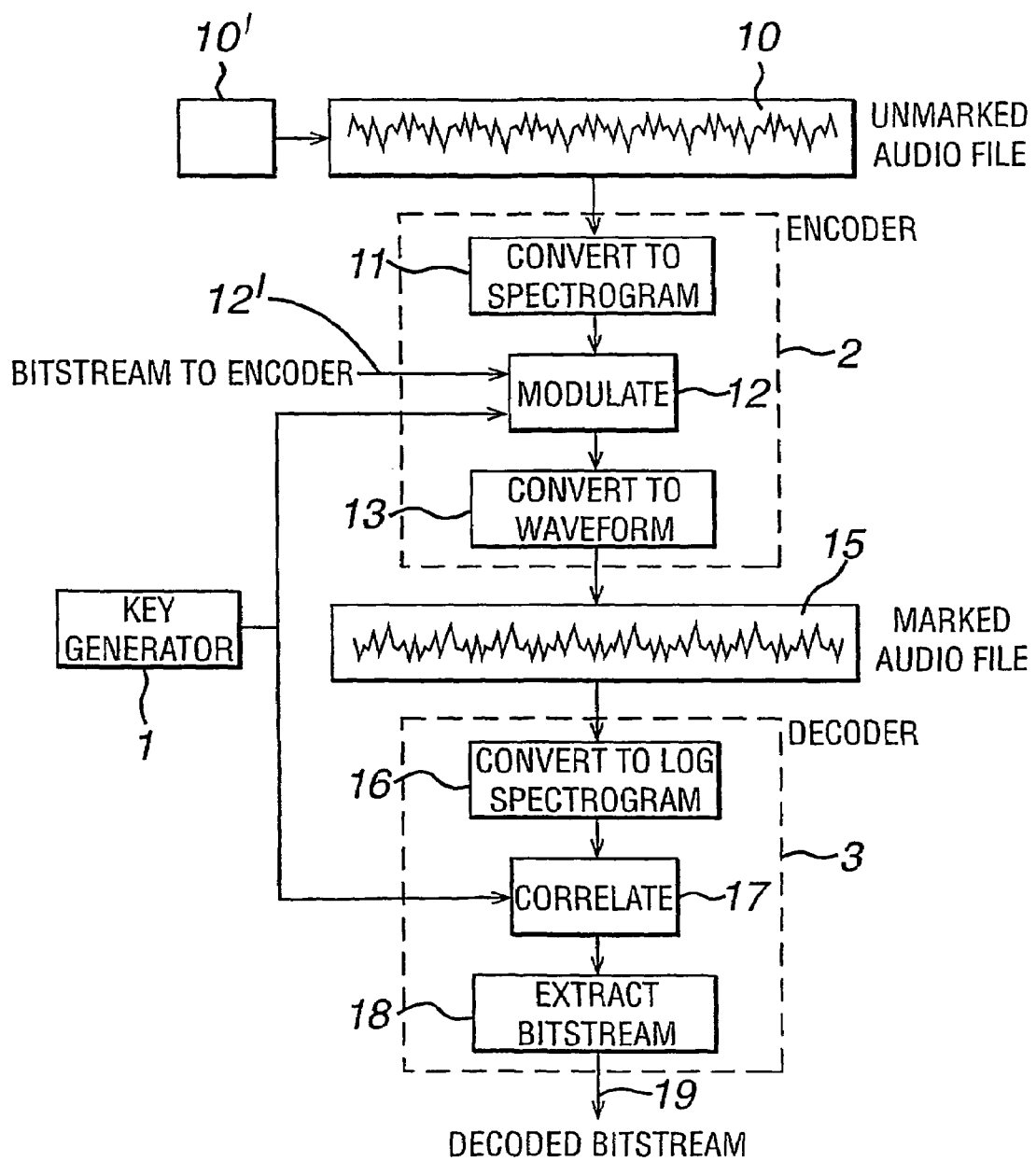
FIG. 2 is a block diagram of an encoder and decoder which can be used in the embodiment of FIG. 1 to generate and decode a stegotext.

FIG. 2 of the accompanying drawings shows a block diagram of a more detailed embodiment in accordance with the present invention. In this Figure the covertext is an unmarked audio file which is shown at (10) The source of the audio file is indicated at 10'. This can be a microphone picking up a live event, a recording such as a tape or disc or a signal which has been transmitted by radio or the Internet. This audio file is input to the encoder (2) and in circuit (11) is converted into a power spectrogram. The reason for this conversion is as follows. It is not feasible to convey information in the phase components of the stegotext. The human ear is essentially insensitive to phase, a fact exploited by some compression algorithms. Accordingly a watermarking technique that depends on phase is unlikely to be robust to compression. Moreover it is possible to process an audio file, scrambling the phases of its frequency components, by applying a random "group delay" to the file. Such processing, which is not computationally intensive, will in general destroy any particular wave shape present in the audio file. Thus watermarks which depends on wave shape, that is on the time domain form of the signal, can be rendered unreadable by this processing.

Accordingly in the present invention it is proposed to carry out the watermarking of a covertext by using the power spectrum of the covertext. Thus only the magnitude of each frequency component in the covertext is modified and the phase of each frequency component is preserved throughout the marking process. Phase information is discarded in the decoder. This procedure will now be described in greater detail.

In order to calculate the power spectrogram of the covertext the covertext is divided into blocks 2Y samples long that overlap by half their length. Thus a new block starts every Y samples. In the present embodiment, which as described is designed for audio files with a sample rate $f_s$=44100 Hz, Y is set to 1024.

Each block is multiplied by a window function, known as the analysis window, and the Fourier transform of the windowed block is calculated. The purpose of the window function is to ensure that the sample values taper off towards zero at either end of the block, avoiding a discontinuity. The Fourier transform treats the block as the repeating unit of a periodic function. Since the windowed block consists of real samples, its Fourier transform is conjugate symmetric with respect to positive and negative frequencies. The negative frequency components carry no additional information and can therefore be discarded.

Each Fourier coefficient is a complex number whose magnitude represents the amplitude of the corresponding frequency component and whose argument represents its phase. When the phase information is discarded, what remains is the power spectrum of the signal. In a strict sense the power spectrum is obtained by squaring the magnitude of each Fourier coefficient.

When a number of consecutive power spectra are placed alongside one another, a grid of values is formed: one axis, conventionally vertical, represents frequency whilst the other, conventionally horizontal, represents time. This grid is the power spectrogram of the audio sample. FIG. 3 of the drawings is an example of a power spectrogram taken from a segment of music. In this figure the values in the grid are shown as various shades of grey. The right hand column running from −8 to 3 is a scale against which the brightness levels of the spectrogram can be matched so that the spectrogram can be evaluated.

The choice of Y determines the resolution of the spectrogram. In the frequency direction, the resolution is $f_s/2Y$; in the time direction, the resolution is $Y/f_s$, In the present embodiment these values are 21.5 Hertz and 23.2 ms respectively. The axes of FIG. 3 are measured in these units.

Whilst it may appear to be difficult satisfactorily to reconstruct an audio waveform from its power spectrogram it is possible if phase information is retained. The spectrogram data can be returned into the time domain with an inverse Fourier transform, overlapped in the same manner before, and added together.

In order to watermark the covertext from which the spectrogram was obtained it has been discovered that as long as modifications to the spectrogram are small and as long as the original phase information is retained the above described method recreates a satisfactory audio waveform. It is to be observed that the reconstructed time-domain segments are no longer guaranteed to taper to zero at either end; the subjective quality of the final waveform is therefore improved if the segments are windowed with the synthesis windows as described before being added together. The analysis and synthesis windows must be chosen to ensure that there is no overall amplitude modulation through the system. In the present embodiment each of these windows is the square root of a raised-cosine function.

In FIG. 2 the modulation of the spectrogram is carried out in a circuit generally indicated at (12) in response to the bit stream to be encoded.

Finally in block (2) circuit (13) returns the modulated power spectrograms to the time domain and synthesises these so as to convert them into the stegotext. In FIG. 2 the stegotext is indicated at 15.

The decoder (3) comprises a circuit (16) for converting the stegotext to a log spectrogram, a circuit (17) utilising the key to correlate the log spectrogram so as in circuit (18) to extract the bit stream representing the watermark code and which is output at (19).

It has been discovered that the extent to which an element of a power spectrogram of an audio signal can be modulated without audible effect is roughly proportional to its original level. Thus in decibel terms additions or subtractions may be made to the power spectrogram up to a fixed amount. The amount of modulation that is perceptible depends on the listening environment, but is typically around 1 dB. Accordingly in the present embodiment the watermarking process is carried out in the "log power spectrogram domain" and consists in making additions or subtractions to the power spectrogram in accordance with the key generated by key generator 1 and the data to be encoded as the watermark. The data is input at 12'.

Since a greater degree of modulation can be applied to spectrogram elements with larger magnitude the information carried in those elements will be less susceptible to noise than in elements with smaller amplitude. However it is impossible to know beforehand which these elements will be. Thus the watermarking scheme being described is prepared to exploit whichever elements the covertext makes available for carrying information. Thus in the present embodiment each spectrogram element in circuit 12 is modulated so as to maximise the information-carrying capacity of the watermark. Thus each data bit in the watermark induces a pattern of modulation in a region of the spectrogram. The pattern of modulations is applied in one sense to encode a "one" bit and in the opposite sense to encode a "zero" bit. Bits are encoded at regular time intervals, namely at a regular horizontal spacing T in the spectrogram.

It is possible that there will be short segments of the covertext in which it is impossible to hide a watermark such as the silent sections of an audio file. It is therefore essential that each data bit affects as long a section of stegotext as possible. In the present embodiment two approaches to this problem are used.

FIG. 4 of the accompanying drawings shows in diagrammatic form one of these approaches. In this approach the spectrogram modulation patterns for adjacent bits overlap. In FIG. 4 each rectangle K represents a copy of the modulation pattern. Each spectrogram modulation pattern K is x time units wide and y frequency units high, y being the full height of the spectrogram. In the present embodiment x is 32 and T=5. Thus when the first 32 column wide block of the power spectrogram of the covertext is modulated by a key of the same size and the key is then stepped by T (5 columns) then the initial five columns of the covertext will remain only modulated by the corresponding five columns of the key. In the next iteration of the modulation the columns 6 to 37 of the covertext will be modulated by the key so that columns 6 to 32 will have been modulated twice. At the third iteration columns 6 to 10 of the first block are left with only the double modulation, but columns 11 to 32 are modulated for a third time, while columns 33 to 37 will receive their second modulations and columns 38 to 42 their first modulation. This sequence is repeated for the entire length of the covertext. The values of x and T can of course vary over a wide range. For example x can be 256, and T can be 10.

The second approach is to apply an error-correction code to the message bits to spread the effect of each bit still further in time.

A convolution encoder shown in FIG. 5 of the drawings is used to spread the effect of each input bit over a longer section of the music in a way which reduces the memory requirements in the decoder as compared to the use of a longer key. The data stream to be encoded is input on a line (30) to a shift register which in this embodiment consists of three D-type flip flops (31, 32 and 33). The clock (clk/2) is provided on a line (34). An output switch (35) which is flipped at a clock rate (clk) is connected to the outputs of a pair of exclusive-OR gates (36, 37) so as to select between one of two exclusive-OR combinations of the bits in the shift register formed by the three flip flops. In the present embodiment the upper exclusive-OR gate (36) is connected to all three bits of the shift register and the lower gate (37) to bits 0 and 2. This encoder is specified by the two-dimensional matrix [111; 101], where the first row of the matrix corresponds to the shift register connections made to the upper exclusive-OR gate, and the second row of the matrix corresponds to the connections made to the lower exclusive-OR gate (37). The patterns of connections can be expressed in polynomial form, with coefficients from the set {O, 1}. In this case the polynomials are $X^2+X+1$ (gate 36) and $X^2+1$ (gate 37).

In this encoder each input bit affects six consecutive output bits (the total number of entries in the matrix) and the output bit rate is twice the input bit rate (the number of rows in the matrix). Such a code is called a "rate ½ code". The entries in each row of the matrix, the "generator polynomials", have to be chosen carefully only codes whose rate is the reciprocal of an integer can be used in the present embodiment. It will be appreciated that this restriction is only caused by the type of encoder used in the present embodiment and has no other relevance. Thus if another form of error correction coding was to be used the restriction need not apply. The identity code, which passes to its output unchanged, is specified by the matrix [1].

The code is called "convolutional" because it can be implemented using a convolution function as follows. The input data bits are first interspersed with zeros according to the code rate. For example, suppose the original data are (1011). The data are interspersed with zeros to obtain (1000101) so that the data is now at half the original rate. Convolving these data with (111011) which is the above encoder matrix written as a single row, yields (111022212111). Taken modulo-2 this is (111000010111). The modulo-2 operation performs the function of the exclusive-OR gates (36 and 37) in the encoder. Thus a four-bit sequence has been encoded into a twelve-bit code word. In general an n-bit sequence is encoded into a (2n+4)-bit code word.

Whilst a convolutional code has been described it will be appreciated that many other suitable types of error-correcting code can be used. Such codes include Reed-Solomon code, BCH codes, Golay codes, Fire codes, Turbo codes, Gallagher codes and Mackay-Neal codes.

Synchronisation encoding is carried out before convolution encoding. Thus, synchronisation flags are inserted into the encoded stream of data bits. Thus synchronisation of the encoded bit stream is achieved by inserting a start flag into it. The flag pattern is a "0" followed by five "1"s. To ensure that this pattern does not otherwise occur in the data stream, any sequence of four "1"s has an extra zero bit inserted after it. This is known as "zero stuffing". The stuffed zeros are removed by the decoder. This procedure gives a penalty of six bits per start flag plus an overall reduction in data rate by just over three percent. Those skilled in the art will realise that many alternative methods for this are possible.

Returning now to FIG. 6 of the drawings this shows how the two processes just described are incorporated in the encoder. Thus again (10) indicates the covertext to be encoded and K indicates a current window being processed and K-1 indicates the previous window. At the multiplier (41) the extracted window K is multiplied with an analysis window function (42) so that the extracted window tapers at each of its ends. In circuit (43) the fast Fourier transform of the extracted window modified by the analysis window function is obtained. Rectangular polar conversion is carried out in circuit (44) so as to generate the required power spectrogram. This power spectrogram is modified as already described in circuit (45), which corresponds to circuit 12 of FIG. 2, with the phase component of the spectrogram remaining unchanged.

To complete the generation of the stegotext, polar rectangular conversion is carried out in circuit (46); inverse fast Fourier transform is taken in circuit (47) and the synthesis window function (48) is used to multiply the output of the inverse fast Fourier transform circuit (47) at (49). Finally the overlapped windows are added at (50) to generate the stegotext indicated at (15).

It will be appreciated that it is desirable to have a number of different watermarks available. Basically the possibility of using a number of different watermarks makes it considerably harder for an attacker to decode, remove or falsify a hidden message without knowledge of which mark is to be used.

In the present embodiment the word "key" is used to refer to a particular member of a family of watermarks. Again in the present embodiment the keys are generated pseudo-randomly, and any one key is determined by a single integer which is used as a seed. This is the seed input shown in FIG. 1 of the drawings.

In the present embodiment the key is an array K(t,f) of spectrogram modulation values where t and f are integer indices and $-1 \leq K(t,f) \leq +1$. K(t,f) is defined to be zero outside the range $-X/2 \leq t < X/2$ and $0 \leq f < Y$. Let the spectrogram of the covertext be G(t,f) and the spectrogram of the stegotext be H(t,f). Let $d_i$ represent the data bits to be encoded, where $d_i = \pm 1$ (rather than 0 or 1). In the interests of simplicity error-correction coding is ignored. Then the encoding algorithm is given by $$H(t, f) = G(t, f) \prod_i e^{sd_i K(t-iT, f)} \qquad (1)$$

and hence, given suitable choices of branch cut, $$\log H(t, f) = \log G(t, f) + s \sum_i d_i J(t - iT, f) \qquad (2)$$

where s is a real constant which determines the encoding strength. In equations (1) and (2) G and H are complex but K is real. Thus, by equation (1), argH=argG. The watermark is therefore encoded in the power spectrum, and the phases of the original spectral components are preserved.

It will be appreciated that the design of the key is of paramount importance in the generation of a stegotext which is robust against attack. Thus design consideration for the key will now be described in detail.

A key that consists simply of a white noise pattern, where each cell in the key is independently and identically distributed, is attractive for many reasons. It is computationally easy to generate and has the maximum possible information-carrying capacity. In general it has low correlation with the covertext and has a single narrow autocorrelation peak. Experiments have shown that it can be robust to a wide variety of manipulations of the audio file while still being encoded with sufficiently low strength to be inaudible. However by manipulating the stegotext using a group delay attack on the spectrogram in which individual rows are shifted left or right at random, it is with the spectrogram resolution already given possible to arrange the group delay parameters so as to shift the rows by more than one column. This destroys any correlation between stegotext and key. It appears to be impossible to select a spectrogram resolution that simultaneously gives perceptually satisfactory construction of the stegotext and robustness against all forms of this group delay attack.

Figure 7:
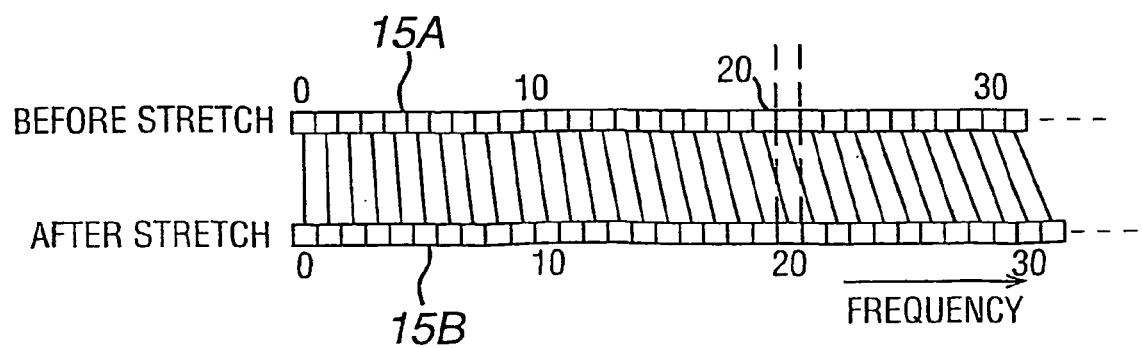
FIG. 7 is a diagram illustrating a time-stretch attack on a stegotext.

Moreover the stegotext can be resampled so that all frequencies increase by say 5% (less than one semitone), and the text shortens in time by the same factor. The effect of this on the spectrogram is to stretch it vertically and shrink it horizontally. This procedure is shown diagrammatically in FIG. 7 where 15A represents the original stegotext and 15B is the altered stegotext. It can be seen that very few of the cells will still coincide; along the frequency axis cells with $f \geq 20$ will not overlap at all with their previous positions. The correlation function is again destroyed.

The first of these two problems, namely stretch in one dimension, can be overcome by modifying the key so that it contains repeating columns. Experiment shows that repeating each spectrogram column twelve times is sufficient to ensure that the group delay required to destroy the correlation function has a perceptually unacceptable effect on the stegotext. The cost is in reduced information-carrying capacity: the autocorrelation peak of the key is wider and lower, and so a greater encoding strength isreq required for a given robustness.

The second problem can be overcome by exhaustive search. The correlation function can be evaluated at a range of different resampling rates and, by finding the one that gives the strongest correlation, determine by what factor the file has been resampled. Unfortunately, it is possible to resample a stegotext in such a way that the pitches change but the overall time remains constant, or so that the pitches stay constant but the overall time changes. This latter process is common in broadcast applications where, for example, it is desired to make a piece of music fit exactly a given slot. There is therefore a two-dimensional space of possibilities to search: the stegotext may have been arbitrarily stretched in frequency and/or time. If the key has been modified to include repeating columns as above, the autocorrelation function is wide and hence the range of possible time stretches need only be sparsely sampled; nevertheless, the computational burden is great.

However the present invention provides a solution to this problem. Considering carefully the effect on the key of a stretch relative to some fixed origin, it can be seen that the relative effect of the stretch is constant over the key; it is the absolute effect that varies and which gives rise to the problem above. In the present embodiment the key pattern is modified so that higher spatial frequencies are filtered out further from the origin.

For the purposes of the following discussion the covertext, stegotext and key will be considered as images in the log spectrogram domain. When referring to "frequencies" this will mean spatial frequencies in these images, not frequencies in the underlying audio.

First consider the problem in one dimension. Let $f(t)$ be a sine wave, $f(t) = \sin \omega t$. Squashing by a factor $\alpha$, gives $g(t) = \sin \alpha \omega t$. The phase angle $\phi$ between these sine waves is given by $\phi = \alpha \omega t - \omega t = \omega t(\alpha - 1)$. Insisting that the correlation between $f(t)$ and $g(t)$, calculated in a suitably-chosen interval around t, exceed some threshold is equivalent to bounding the phase angle $\phi$ so that $|\phi| < \phi_0$. Thus there is a constraint on $\omega$ in terms of $t: |\omega| < \phi_0/(\alpha-1)t$, or, where $\alpha$ is chosen to be the greatest stretch to which resistance is required, $1/\omega > C|t|$ for some positive constant C. In view of this relationship, it is simpler to talk in terms of the timescale $\tau$ of a sinewave, where $\tau = 1/\omega$.

It is now possible to specify the frequency content of a function that correlates well with itself when stretched. It must contain no frequency components with timescales shorter than a threshold timescale $\tau = C|t|$, where the constant C sets the degree of stretch resistance desired. Such a function can be obtained by suitable filtering of a white noise signal. A low-pass filter is required whose cutoff frequency varies inversely with t. Such a filter will hereinafter be referred to as a "swept" filter.

Figure 8:
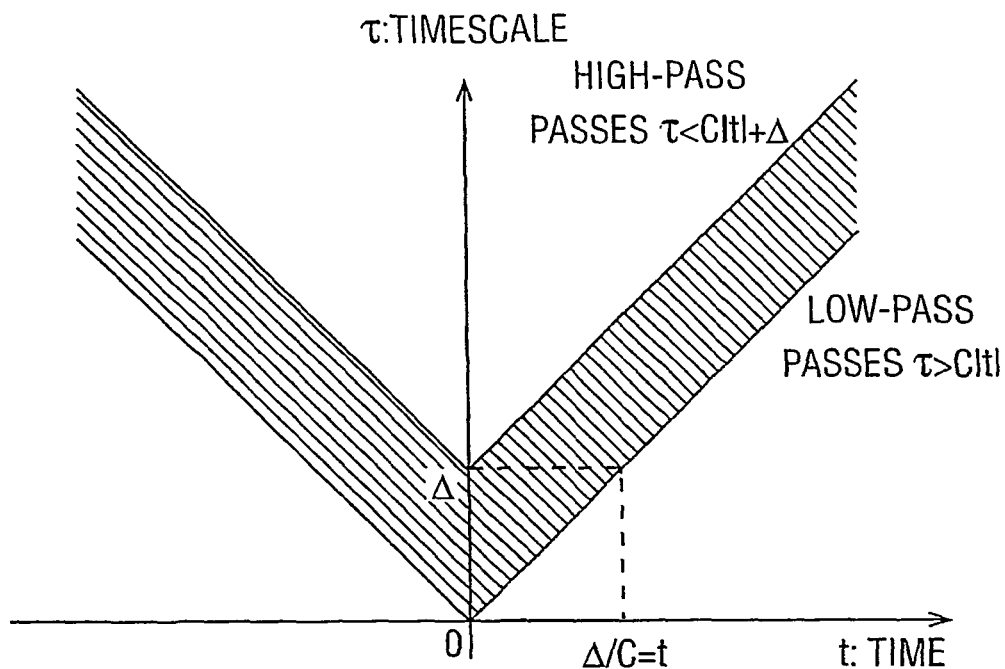
FIG. 8 is a graph illustrating filter parameters used in accordance with an embodiment of the present invention in the system of FIG. 1.
Figure 9:
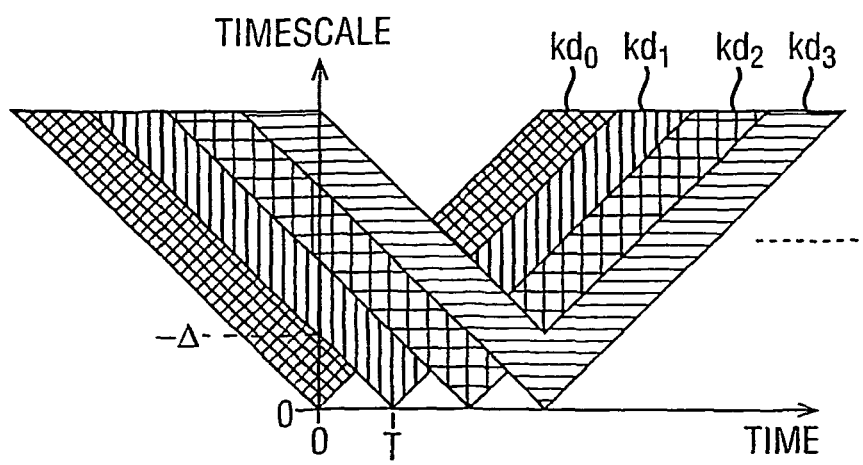
FIG. 9 is a graph showing the filter characteristics of consecutive keys.

As already described in the present embodiment keys corresponding to consecutive data bits are overlapped. In order to minimise overlap between the frequency components present at a particular point in time due to one copy of a key and those due to previous or subsequent copies, a high-pass filter is also applied to the key. The overall effect is therefore that of a band-pass filter. The cutoff frequency of the high-pass filter is swept so as to match the low-pass characteristics of the adjacent keys. This is demonstrated in the graph of FIG. 8. The "bandwidth" $\Delta$, which is constant in terms of timescale, is given by $\Delta = CT$, T being the interval between consecutive applications of the key to the covertext. FIG. 9 shows how the copies of the key for four consecutive bits $d_0$, $d_1$, $d_2$ and $d_3$ overlap.

Figure 10:
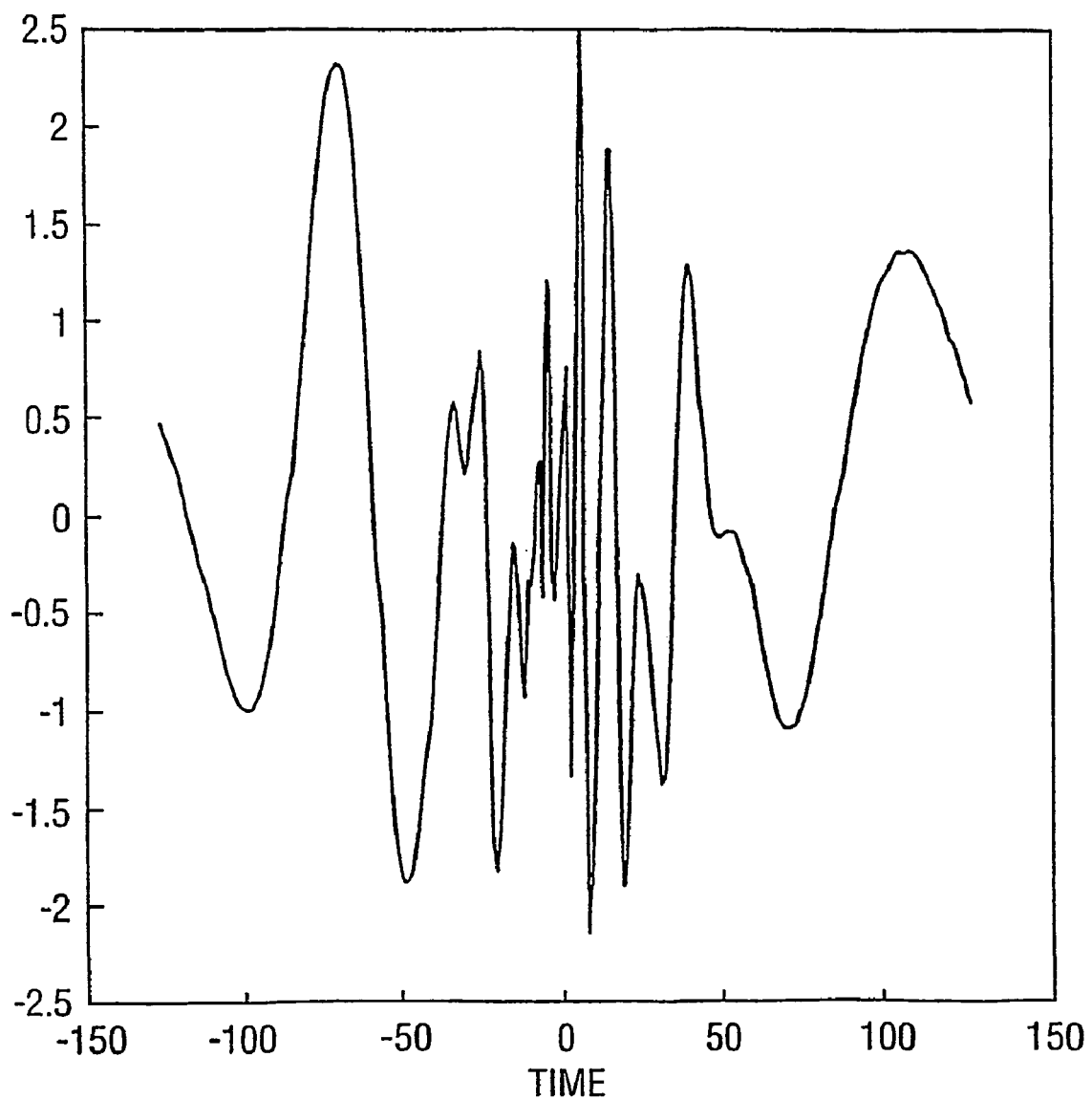
FIG. 10 is a graph showing the one dimensional white noise signal with a swept band-pass filter.

An example of the result of applying such a swept band-pass filter of the type just described to a white noise signal is shown in FIG. 10.

Similarly, a two-dimensional key can be generated from a two-dimensional white noise pattern. A filter with characteristics varying as described above is applied separately in each dimension. After filtering, the data values are passed through a non-linear function to enforce the condition $-1 \leq K(t,f) \leq +1$; in this embodiment, sine is used.

Figure 11:
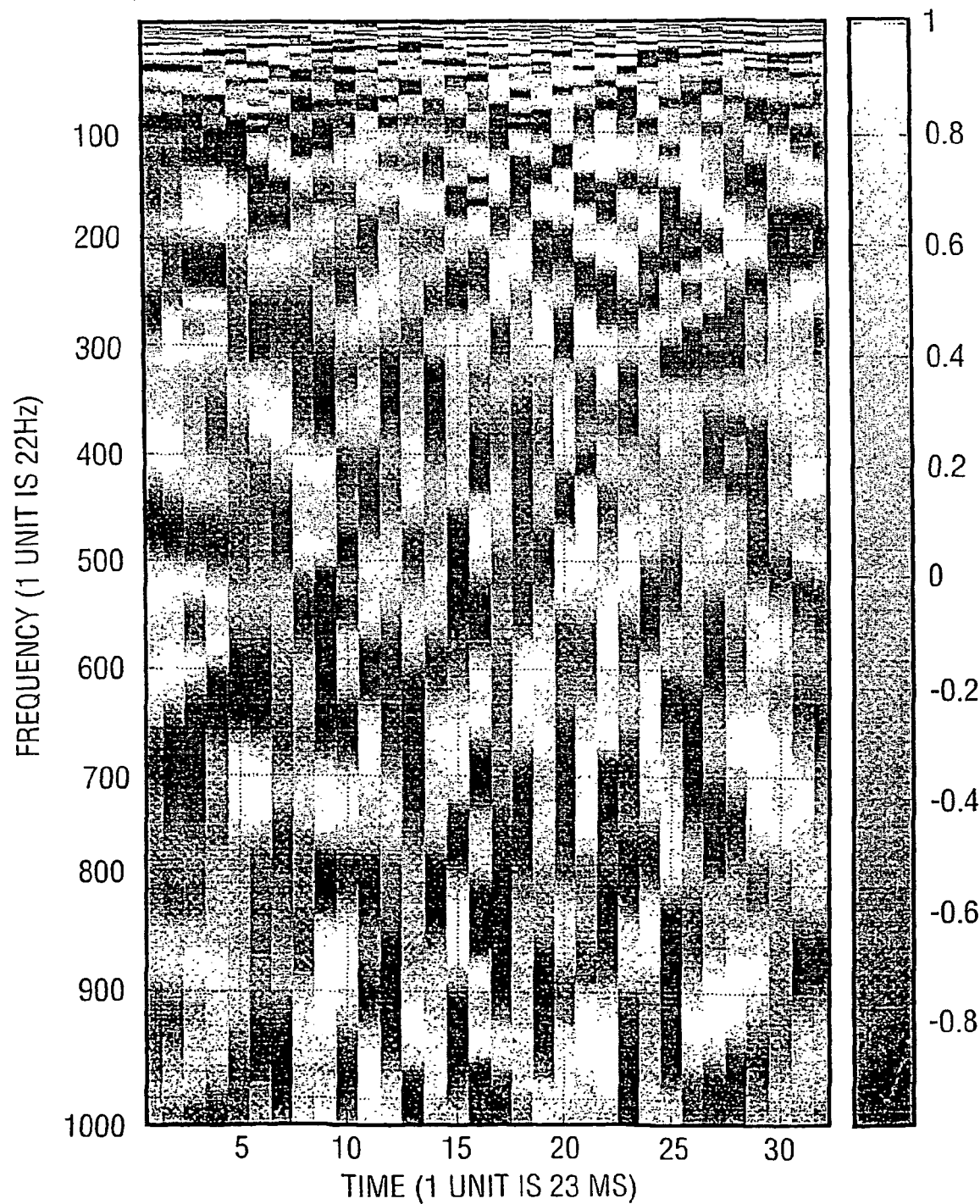
FIG. 11 is a graph illustrating the result of two dimensional white noise with swept filters in each direction.

An example of the resulting pattern appears in the power spectrogram of FIG. 11. Here the axes are 'time' and 'frequency' (audio frequency is now meant): these match the axes of the spectrogram of FIG. 3 to which the key will be applied. The origin in the time direction is in the middle of the key, whereas that in the frequency direction is at the top. The right hand column in FIG. 11 has a similar function to that of the scale column in FIG. 3.

The present embodiment applies band-pass filtering not only along the x axis but also along the y axis, although since copies of the key are not overlapped in that direction just low-pass filtering would suffice. It is possible to increase the information-carrying capacity of the key by using a low-pass rather than a band-pass filter.

If the value of the constant C in the above equation is increased, the key generated becomes resistant to greater stretches. The high-pass and low-pass filter characteristics become closer together and so the pass band of the filter becomes narrower. This reduces the information-carrying capacity of the key. There is thus a tradeoff to be made between stretch resistance and information-carrying capacity. In the present implementation C=0.15 (pixels per cycle) per pixel and the key so generated works satisfactorily under stretches of up to about ±6% in either the time or the frequency directions. It will be seen that the above definition of C refers to pixels. In the present context the term pixel has different meanings when considering filtering in the horizontal direction of the spectrogram and filtering in the vertical direction.

In the horizontal direction the term pixel is being used to mean the time interval between columns of the spectrogram. When considering filtering in the vertical direction the term pixel is used to mean the difference in frequency of two adjacent rows of the spectrogram.

Thus in FIG. 11 a horizontal pixel is approximately 23 millisecs whereas in the vertical direction it is approximately 22 Hz.

Thus in using the formula $\tau > C|t|$ for the passband of the low pass filter $\tau$ is measured in pixels per cycle and t represents the x or y coordinate of the point of the spectrogram under consideration measured in pixels as hereinbefore defined from a reference point or origin. In FIG. 11 the reference point is at the centre of the top edge of the picture. This reference point is chosen so as to correspond to zero frequency. It is possible to select other reference points but the zero frequency condition is preferable.

The peak correlation of a typical key with itself after a range of stretches in both frequency and time is shown in FIG. 12. The values have been normalised so that the peak autocorrelation of the key is 1.

When a two-dimensional correlation between the key and the stegotext is calculated, it is found that the correlation peak can move slightly away from the line y=0 when the stegotext has been stretched in frequency. For this reason the present embodiment uses a two-dimensional correlation; the values of the function at small offsets in the y direction are added together to form a one-dimensional function to pass to the bit synchroniser.

Figure 23:
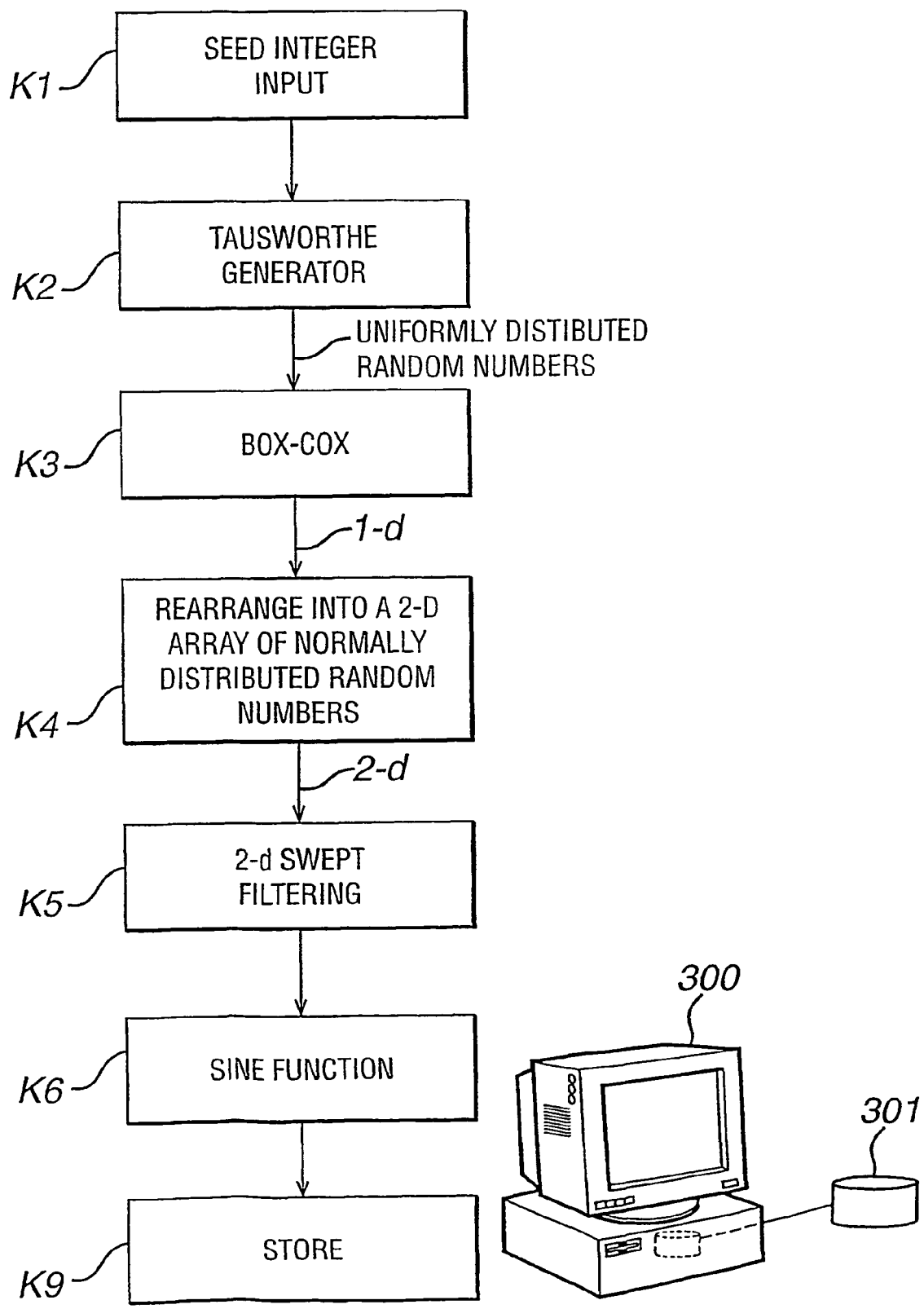
FIG. 23 is a diagram illustrating the generation of a key.

Referring now to FIG. 23, this shows a flow diagram of the generation of a key K.

At step $K_1$ a seed integer is input and at step $K_2$ this number is supplied to a Tausworthe generator which generates uniformly distributed random numbers. The output of the Tausworthe generator is supplied at step $K_3$ to be converted by the Box-Cox method into 1-d Gaussianly distributed random numbers. In a key with x=32 and y=1024 there will be 32768 such random numbers. The process carried out by the Tausworthe generator and the Box-Cox method are fully described in "Principle of Random Variate Generation", a book by John Dagpunar published in the series oxford Science Publication by the Clarendon Press in 1988.

At step $K_4$ the 32768 random numbers are rearranged into a 2-d array of 32×1024 random numbers.

At step $K_5$ the 2-d swept filtering previously described is carried out.

At step $K_6$ the data values are passed through a non-linear sine function to enforce the condition $-1 \leq K(t,f) \leq +1$.

Finally at step $K_9$ the key can either be directly used in an encoder or a decoder or can be stored in a suitable readable memory.

All the above processes can be carried out by a suitably programmed computer as shown at 300 and stored on a recording medium 301 which can be a CD, ROM, DVD disc, tape or any other suitable storage medium.

Having described the basic steps and principles of encoding a covertext in accordance with the present invention, FIG. 13 shows a block diagram of an encoder.

As in previous figures (10) represents a covertext, in the present embodiment music, which is to be encoded and (15) represents the final stegotext.

In circuit (51) the covertext is transformed into a log abs spectrogram.

The spectrogram so generated is supplied to a FFT circuit (51) where the received spectrogram is clocked by a clock (52) into a spectrogram buffer (53). The FFT circuit (51) carries out the overlapping segmentation of the input spectrogram and the windowing function described in FIG. 6. The clock (52) ensures that the content of spectrogram buffer (53) represents in spectrogram form a quantity of music equal to the length of the key, in the present embodiment 256 or 32 columns.

The data to be encoded is supplied at (55) to a circuit (54) for adding, as already described, synchronisation flags and for carrying out zero stuffing.

The output of circuit (54) is supplied to the convolution encoder (56) which corresponds to the encoder described with respect to FIG. 5 and which has the requisite polynomials supplied to it at (57).

The key matrix is supplied to the encoder at (58) to a circuit (59) where the key matrix is converted into a set of values which can be directly multiplied into the spectrogram held in the spectrogram buffer (53). These values are in the form of two matrices, one for encoding a zero bit and the other for encoding a one bit. These matrices are the antilog of the key and the reciprocal of the antilog of the key. The operation of multiplying these matrices into the held spectrogram is equivalent to adding or subtracting in the log spectrogram domain.

The degree of strength with which the key modulates the contents of the buffer (53) is determined by an input (60). This input corresponds to the real constant s in quation 2.

The two matrices are selectively multiplexed with the contents of the spectrogram buffer (53) as indicated at (61), the selection being made in accordance with the output of the convolutional encoder (56) so that the music stored in buffer (53) is encoded with a single bit of data. The contents of the buffer (53) are shifted along by one clock period for each bit written into the IFFT circuit (62) so that the main encoding loop is executed once for each bit written.

The output of the IFFT circuit (62) is applied to an anti-clip buffer (63). This is to ensure that the data read from circuit (62) is not clipped when the data is written out as a music file. If clipping is imminent an amplitude modulation curve is generated to reduce the volume of the output gradually so that clipping is just averted. The volume is increased to normal, again gradually, when it is safe to do so.

Finally the output from anticlip circuit (63) is output as the stegotext (15).

FIG. 13 also includes a scrambler 65. Many possible scramblers can be used but a typical one is described in the V32 standard of CCITT. The inclusion of a scrambler is optional, as is the convolutional encoder.

The previous description has for reasons of simplicity described the use of a single key. It will of course be appreciated that more than one key can be used, each key having been generated by a different seed integer. Additionally multiples of the key or keys can be used to watermark a stegotext. In the above described embodiment the multiple is "1" so that wherever a multiple of a key is mentioned it is implicit that the multiple can be "1" i.e. the key remains unchanged apart from its sign.

The actual way in which two or more different keys are used to watermark a stegotext or to retrieve the watermark code are entirely analogous to the embodiments described in this specification. Thus if there is more than one key which key is multiplied into the spectrogram at (61) at any one time will be determined in accordance with the data to be encoded. If multiples other than ±1 are used to modulate the spectrogram more than 1 bit can be encoded each time. Decoding will, of course, utilise the same set of multiples.

Having described an embodiment of an encoder according to the present invention attention will now be turned to the problem of decoding a stegotext which may have undergone compression or stretching to recover the coded data.

Having discussed the characteristics of the key which is used in the encoder of FIG. 13 to modulate the power spectrum of the covertext it will be appreciated that when decoding a stegotext to extract the watermark data the data bits can be identified by correlating the key with the power spectrogram of the stegotext. If the stegotext has not undergone an attack or has not otherwise being stretched or compressed there will be a clear correlation between the stegotext and the key at those log elements which have been modified in accordance with the data.

The previously described key is capable of dealing with distortions of the stegotext which involve stretches of the stegotext in either the vertical or horizontal directions of ±6%.

In order to deal with cases where the stegotext has undergone greater stretch than the ±6% allowed for by the key a number of approaches are possible.

However the present embodiment utilises a different approach which does not involve direct correlation and this will be now described in detail. Before describing the actual circuits of a decoder there will firstly be a general discussion of the principles involved.

Most demodulators and decoders in the world have been designed to be optimal under the assumption that the wanted signal is corrupted by noise that is additive, white, stationary, and Gaussian. Most are also 1-dimensional in the sense that at any individual time only one real value is received; some are 2-dimensional. In the present embodiment signals are encountered where at any one time point many real values in the form of a whole spectrogram column are received.

Noise is said to be Gaussian if for any individual sample the marginal probability distribution of the value of the noise in that sample (that is the distribution observed if no notice is taken of what the values of other samples are) is a Gaussian, or Normal, distribution with mean zero.

The noise is said to be white if the Fourier spectrum of the noise is examined, the marginal probability distribution of any individual element of that spectrum is the same as that of the marginal probability distribution of any other element.

It is said to be stationary if the marginal probability distribution of any one time-domain sample is the same as that of any other sample, and the joint probability distribution of any one excerpt of the noise of a given length is the same as that of any other such excerpt.

In almost all cases all of these assumption are violated to some extent. Generally this is not important. However in the present invention exceptions from the assumptions are of great importance and accordingly will be discussed in detail.

For example, Student noise can be considered as an example of non-Gaussian 1-dimensional noise. The Student distribution is like a Gaussian distribution, except that the standard deviation is different for each sample; in particular, the inverse variance is drawn afresh for each sample from a Gamma distribution.

Figure 14:
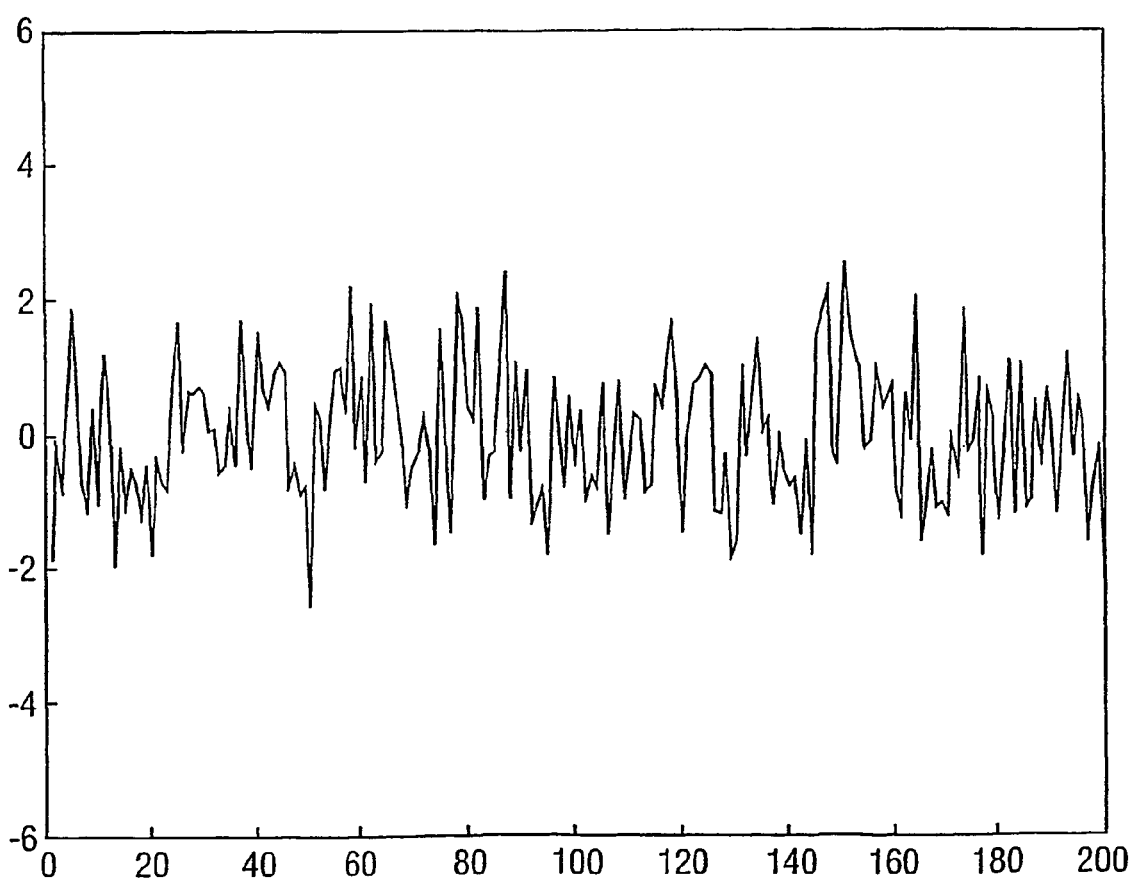
FIGS. 14 and 15 are graphs illustrating different types of noise.
Figure 15:
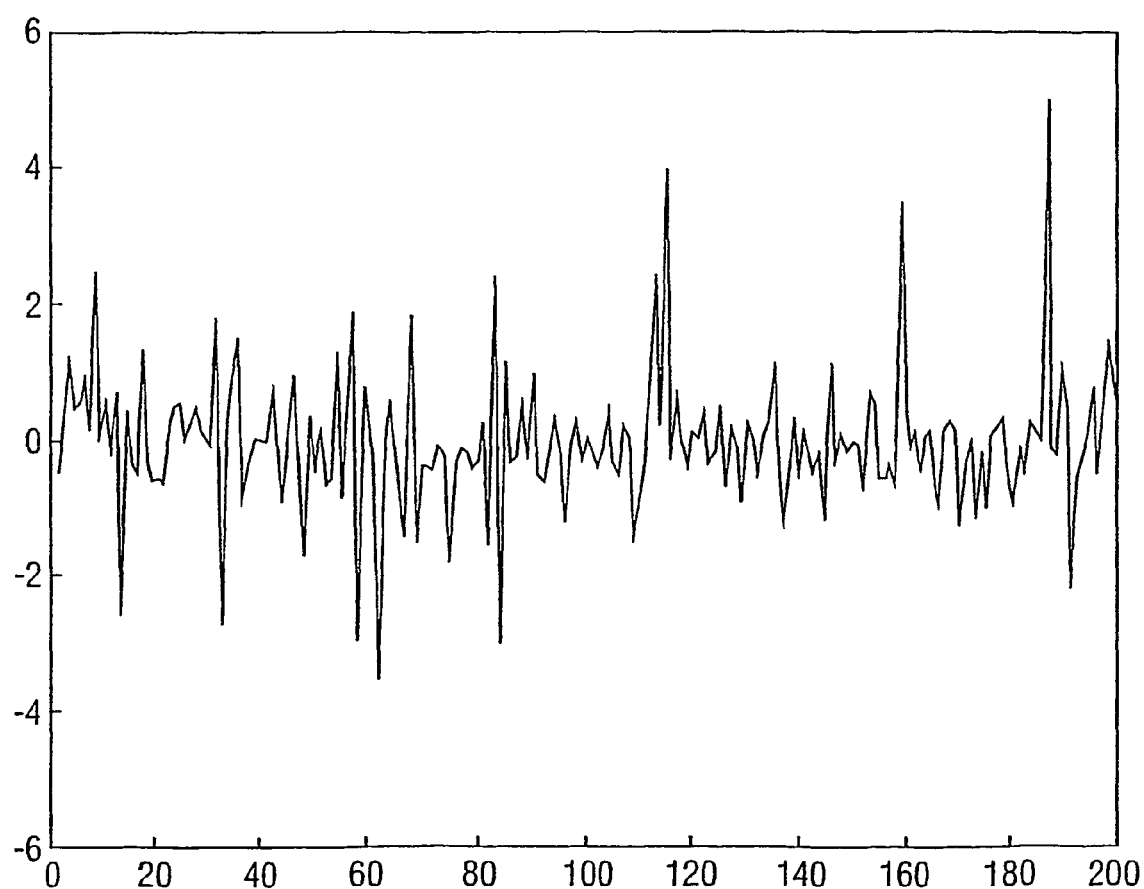

FIGS. 14 and 15 show respectively an excerpt of 1-dimensional white Gaussian noise of variance 1, and of 1-dimensional white Student noise (with a shape parameter m of the associated Gamma distribution equal to 1, and scaled to also have variance 1). Both have the same variance—but they look quite different. The Student distributed noise has some large spikes in it, which would occur only exceedingly rarely in Gaussianly distributed noise.

This matters in situations where the noise is impulsive and where outliers can force (under Gaussianity assumptions) conclusions that are far from correct.

Another example of non-Gaussian noise that is less frequently encountered is noise that is distributed as the log of the ratio of two quantities that are each Gamma distributed. Such noise may have many downward spikes, but none upwards (or the other way round). Such noise turns out to be relevant to the audio watermarking problem.

Non-whiteness may be violated in more ways than the immediately obvious. An example of this is coloured noise. This is noise in which some frequencies are present more than others, but in which the noise is stationary. Typically one may see "pink" noise, where low frequencies predominate; band-limited noise where other frequencies have been filtered out; and "1/f" noise, where the power spectral density is inversely proportional to frequency down to some limit greater than zero.

In general, however, there are other types of non-white noise.

One example is 1-d non-stationary noise. If one dimension only is considered, the noise may be non-stationary; for example the noise from a resistor that gets too close to an intermittent heat source; or the noise recorded after a filter containing a varying capacitance (which will cause change of "colour" as well as of amplitude with time).

Alternatively if the signal is multidimensional, the noise in different dimensions may be correlated, even though the signal(s) is/are stationary against time. Alternatively the noise in some channels/dimensions may have greater amplitude than in others. And of course there is nothing to stop multidimensional noise also being non-stationary against time—as indeed it would not be unreasonable to expect of a log abs spectrogram of music.

In general violation of any of these assumptions may be important in attempting to decode a watermark from a stegotext. However, experiments have shown clearly that if the point of interest is robustness in decoding watermarks of the type with which the present invention is concerned, and particularly in music, then non-Gaussianity is of little importance, while general non-whiteness, in the forms both of correlations between signals between components of different frequencies and of variation in amplitude at different frequencies, is crucially important. A decoder that takes account of non-Gaussianity benefits in producing more sensible values for various intermediate variables in the calculations; whereas one that fails to take account of non-whiteness loses performance and wastes memory and flops.

Basic to what follows is the concept of the multidimensional Gaussian distribution. Let it be supposed that x is an N-vector of real numbers (i.e. it is a column vector with N elements). Let μ denote the mean of the distribution of x (also an N-vector).

Now, just as in the 1-dimensional case there is a variable σ denoting standard-deviation (or alternatively s denoting $1/\sigma^2$), in the N dimensional case there is an N×N matrix S of real numbers which plays a similar role to that of s in the 1-dimensional case but with greater complexity.

First, consider a 2-dimensional case where the distribution of x is spherically (i.e. circularly) symmetric about μ. In this case any slice through the distribution that passes through μ will look like a 1-dimensional Gaussian distribution with for example a standard deviation σ. In that case S will be $I/\sigma^2$, where I denotes the identity matrix. If instead of being circular, the distribution has elliptical symmetry with the long axis of the ellipse aligned with one of the coordinate axes, the S will be a diagonal matrix with the two diagonal elements different and positive. If the ellipse is not aligned with the coordinate axes, then S will be a 2×2 symmetric matrix with all entries non-zero and the diagonal elements positive. The inverse V of S is known as the covariance matrix of the distribution, and S will be referred to as the icov matrix (short for inverse covariance).

S also has one other important property: it is positive definite, which means that for any non-zero vector y, y'Sy will be a positive scalar (Here ' denotes transpose; y'Sy is always a scalar, but it can only be guaranteed that it will always be positive if S if positive definite and y is not zero).

In the N dimensional case, the same picture holds, except "circle" is replaced by "N-dimensional sphere" and "ellipse" by "N-dimensional ellipsoid".

In this case the formula for the probability density of such a distribution is:

$$P(x) = \sqrt{det\left(\frac{S}{2\pi}\right)} e^{-(x-\mu)'S(x-\mu)/2} \quad (3)$$

Now suppose it is required to consider a "random" N dimensional Gaussian distribution with zero mean. "Random", of course has no real meaning unless it is stated what distribution it is being drawn from; what is needed is a distribution on N dimensional Gaussian distributions with zero mean. What that amounts to is a need for a distribution on icov matrices; or one on positive definite symmetric N×N matrices S.

One distribution which satisfies these requirements is the Wishart distribution.

The Wishart distribution has two parameters (other than N), namely k, the "tightness" or "shape" parameter, and V, the "scale matrix". k must be greater than N−1; the larger it is, the tighter is the distribution about its mean. V must be positive definite and symmetric. The mean is $kV^{-1}$. The density is $$P(S) = \frac{det(V)^{k/2}}{2^{Nk/2}\pi^{N(N-1)/4}\prod_{j=0}^{N-1}\Gamma\left(\frac{k-j}{2}\right)} det(S)^{\frac{K-N-1}{2}} e^{-trace(SV/2)} \quad (4)$$

If N is 1, this degenerates to a gamma distribution. However if m and r are the shape and scale parameters of the gamma distribution, then V is 2r and k is 2m.

When 1-dimensional Student noise was previously discussed, it was noted that for each sample there was drawn a new value of $S=1/\sigma^2$ from a gamma distribution, the actual sample then being drawn from a 1-d Gaussian with zero mean and inverse-variance s.

One way of making multidimensional Student noise, then, is to draw, afresh for each sample, a new icov matrix S, then draw the sample itself from a multidimensional Gaussian distribution with zero mean and icov matrix S. Each new icov matrix should be drawn from a Wishart distribution with some appropriate parameters k and V.

In the special case that the scale matrix V of the said Wishart distribution is of the form rI for some positive real number r, this Student distribution is spherically symmetric, and given by:

$$P(x|N,k,r) = \frac{r^{\frac{K-N+1}{2}}\Gamma\left(\frac{k+1}{2}\right)}{\pi^{N/2}\Gamma\left(\frac{k-N+1}{2}\right)(r+x'x)^{\frac{k+1}{2}}} \quad (5)$$

The probability density of the distance R of x from the origin, can then be written $$P(R|N,k,r) = \frac{2r^{\frac{k-N+1}{2}}\Gamma\left(\frac{k+1}{2}\right)R^{N-1}}{\Gamma\left(\frac{N}{2}\right)\Gamma\left(\frac{k-N+1}{2}\right)(r+R^2)^{\frac{k+1}{2}}} \quad (6)$$

It is now possible to appreciate what the log abs spectrogram of music actually looks like. It can be modelled as multidimensional Student noise, but a much better fit is obtained if it is modelled slightly differently. Instead of drawing a new icov matrix for every sample, either a new icov matrix will be drawn once every bit period, or less frequently. Then each sample from the resulting quasi-Student distribution is considered as one column of the spectrogram. This will be called the "detV" distribution for reasons that will become apparent hereinafter.

The question of what the parameters of the associated Wishart distribution should be will be addressed later in this specification. However, ideally these parameters will be determined for some broad corpus of music, but in practice it will probably not make a great difference if only a small number of pieces is used, providing that they contain representatives of the sort of music likely to be encountered. The "remaining uncertainty" can be taken up by the Wishart distribution having k not greatly larger than N.

The special case that the Wishart scale matrix V is a very small multiple of the identity (in practice taken to be $e^{-12}I$) will be referred to as the "detz" distribution—"Z" here is for zero.

Having discussed the above background it is now possible to define the characteristics of decoders which can be used to decode stegotexts generated in accordance with the present invention. Each decoder is designed to be an optimal bit-by-bit memoryless decoder for a particular model of the noise (i.e. the covertext or music). As such each decoder calculates the Bayesian posterior distribution on a data bit of interest in the light of what has been received, then picks the value (0 or 1) with the highest posterior probability. Note that the word "optimal" here has a very specific meaning—the decoder is that which produces the best output, irrespective of whether it is the cheapest or the most expensive decoder to implement.

Clearly such a decoder will only really be optimal if the model is accurate. If not, the effective capacity of the channel will be reduced.

Thus it is possible to implement the decoder using a correlation function, in turn implemented using FFTs to produce a bit-by-bit memoryless decoder on the assumption that the "noise" is stationary, white, and Gaussian. The fact that this assumption is false leads to very great loss of capacity when the signal strength is reduced to 0.005. This loss can be mitigated to some extent by throwing away all the low frequency components of the key, but it is still a heavy loss.

Accordingly the embodiments of a decoder to be described involve changing to a noise model which defines the noise as non-white multidimensional Gaussian noise that is restricted to being stationary in time, and to have a known icov matrix.

A decoder can be implemented in an extremely simple manner for this noise model: The known icov matrix S is taken, its Cholesky decomposition is formed (i.e. its triangular positive-definite square-transpose-root C such that C'C=S), and both log abs spectrogram of the received signal and the key are pre-multiplied by C. Because the process of pre-multiplying by C converts the presumed non-white noise into white noise, this decoder can be called the "Whitened Gaussian" decoder.

This decoder works well when the icov matrix s is indeed that modelling the noise (i.e. the log abs spectrogram of the music). To see why, the noise may be considered as a very elongated ellipsoid in N-space. This decoder works by stretching the ellipsoid into a sphere, while at the same time stretching the carried signal by the same amount in each direction. The result is that the part of the signal parallel to the shortest axis of the ellipsoid is enormously stretched, way beyond the noise, and hence is easily recoverable.

However, this decoder has problems if the S it is using is not that of the music whose watermark is being decoded. Intuitively this happens because instead of stretching the noise into a sphere, it is stretched into a different elongated ellipsoid—and hence the absolute magnitude of the noise may remain large compared with that of the stretched signal. So at the very least this method is going to demand availability of the correct icov matrix for each piece of music at the time of reading its watermark, already a significant disadvantage.

The situation is, however, very much worse than that, because of the fact that operations are in the log abs spectrogram domain. Consider the distortion that consists of adding white Gaussian noise to the time-domain music signal. If the operations were in the time-domain, this would simply slightly widen all the narrow dimensions of the ellipsoid. However, for this to be true in the log abs spectrogram domain, the distorting-noise added would have to be constantly varying in spectral content in a manner that remained precisely proportional to the spectral content of the music. Since this is not the case, more complicated behaviour can be expected. It turns out that this behaviour involves rotating the ellipsoid to point in one or more different directions—and the decoder fails in exactly the same way that it would have if the icov matrix of a different piece of music had been used.

In order to overcome these problems the decoder to be described uses the "detV" distribution—i.e. a multidimensional Gaussian noise distribution with unknown icov matrix drawn from a Wishart distribution and locally constant over the period of 1 bit. This takes account of the fact that neither the original icov matrix of the music being decoding from, nor the exact effect on it of the distortions that have occurred in distribution are known—but that it is known that such a matrix exists.

Thus the decoder to be described is designed to be an optimal decoder for this noise model. Accordingly the embodiments of decoders to be described hereinafter use a probabilistic approach to calculate given the received signal, the posterior distribution of each data bit. In order to do this the decoders to be described utilise Bayes Theorem.

Thus consider the signal received during 1 bit period, which is M columns of log abs spectrogram each being a vector of N elements.

It is assumed that the mean of the noise distribution is zero. Providing the actually observed mean of the whole spectrogram is subtracted, this is very nearly equivalent to saying that the mean is unknown, and that a priori it was believed it could equally well have taken any value.

Now let K be the value of the key in the log abs spectrogram domain as it was actually used—i.e. it has already been multiplied-by the strength at which it was used (and any use of 10 instead of e as base of logarithms has been allowed for). If the key consists of M columns each of height N then K is an N×M matrix. Let b be the value of the bit in question; it is assumed that there is no overlapping bit as it turns out to make so little difference to the decoder whether or not there are overlapping bits that it can be assumed there are not for simplicity. Consider, for simplicity, b to be +1 or −1 rather than 1 or 0. Let X be the matrix consisting of the M columns of the log abs spectrogram of the music onto which b was watermarked. Let Y be the received log abs spectrogram columns corresponding to X in the stegotext. It is assumed for now that timing is known.

What now has to be known is P(b|Y). It would of course be equally good to know $$\frac{P(b=+1\mid Y)}{P(b=-1\mid Y)}$$

(or its logarithm) and if this is greater than 1 (respectively positive) to decode b=1, and otherwise b=−1.

What is the starting information? This can be summarised in the following equations:

$$P(b) = \frac{1}{2} \text{(irrespective of whether } b = +1 \text{ or } -1\text{)} \tag{7}$$

$$P(Y|b)=P(X=Y-bK) \tag{8}$$

$$P(X\mid S) = \det\left(\frac{S}{2\pi}\right)^{\frac{M}{2}} e^{-\frac{1}{2}\sum_m x_m^\top S x_m} \tag{9}$$

$$P(S) = \frac{\det(V)^{k/2}}{2^{Nk/2}\pi^{N(N-1)/4} \prod_{j=0}^{N-1} \Gamma\!\left(\frac{k-j}{2}\right)} \det(S)^{\frac{k-N-1}{2}} e^{-\text{trace}(SV/2)} \tag{10}$$

where $x_m$ denotes the mth column of X, and k and V are the parameters of the relevant Wishart distribution.

The decoder then applies Bayes' theorem as shown in the following equations to find the required posterior probabilities of the successively received data bits.

$$P(B\mid Y) = \frac{P(b)P(Y\mid b)}{P(Y)} \tag{11}$$

$$\therefore P(b\mid Y)P(Y) = P(b)P(Y\mid b) \tag{12}$$

$$= \frac{1}{2}P(Y\mid b) \tag{13}$$

$$= \frac{1}{2}P(X = Y - bK) \tag{14}$$

-continued $$= \frac{1}{2} \int_{\text{all pos def sym NxN matrices } S} P(X = Y - bK \mid S) P(S) dS \quad (15)$$

$$= \frac{1}{2} \int_{\text{all pos def sym NxN matrices } S} \det\left(\frac{S}{2\pi}\right)^{\frac{M}{2}} \quad (16)$$

$$e^{-\frac{1}{2}\Sigma_m (y_m - bk_m)'S(y_m - bk_m)} P(S) dS$$

$$= \frac{1}{2} \int_{\text{all pos def sym NxN matrices } S} \det\left(\frac{S}{2\pi}\right)^{\frac{M}{2}} \quad (17)$$

$$e^{-\frac{1}{2}\Sigma_m (y_m - bk_m)'S(y_m - bk_m)} \frac{\det(V)^{k/2}}{2^{Nk/2}\pi^{N(N-1)/4} \prod_{j=0}^{N-1} \Gamma\left(\frac{k-j}{2}\right)}$$

$$\det(S)^{\frac{k-N-1}{2}} e^{-\text{trace}(SV/2)} dS$$

$$= \frac{1}{2} \int_{\text{all pos def sym NxN matrices } S} \quad (18)$$

$$\frac{\det(V)^{k/2}}{(2\pi)^{NM/2} 2^{Nk/2} \pi^{N(N-1)/4} \prod_{j=0}^{N-1} \Gamma\left(\frac{k-j}{2}\right)}$$

$$\det(S)^{\frac{k+M-N-1}{2}} e^{-\frac{1}{2}(\text{trace}(SV) + \Sigma_m (y_m - bk_m)'S(y_m - bk_m))} dS$$

In the above equations 13 follows from equation 12 by invoking equation 7. Equation 14 follows by invoking equation 8.

Equation 15 is derived from the above equations using basic probability theory which states that $P(A) = \int P(A,B) dB$, namely that the probability of a union of disjoint events being the sum or integral of individual probabilities, and by the definition of conditional probability which states $$P(A/B) = \frac{P(A, B)}{P(B)}.$$

Equation 16 follows from equation 15 by use of equation 9. Equation 17 follows from equation 16 by use of equation 10. Finally equation 18 is obtained by simplifying by collecting factors.

The integration of equation 18 is exceptionally complex but results in equation 19 from which follows equation 20. Thus equation 20 is obtained from equation 19 by dividing the version of equation 19 where b=1 with the version in which b=-1.

$$P(b \mid Y) P(Y) = \frac{1}{2} \frac{\det(V)^{k/2}}{\pi^{NM/2}} \quad (19)$$

$$\frac{\prod_{j=0}^{M-1} \Gamma\left(\frac{k+M-j}{2}\right)}{\prod_{j=N-M}^{N-1} \Gamma\left(\frac{k-j}{2}\right)} \det(V + (Y - bK)(Y - bK)')^{-\frac{k+M}{2}}$$

$$\therefore \frac{P(b = +1 \mid Y)}{P(b = -1 \mid Y)} = \frac{\det(V + (Y - K)(Y - K)')^{-\frac{k+M}{2}}}{\det(V + (Y + K)(Y + K)')^{-\frac{k+M}{2}}} \quad (20)$$

Now, since detV decoding is central to the best algorithm, the best way of evaluating the right hand side of this last equation will now be discussed.

Let W be the Cholesky decomposition of V so that W'W=V Let U=W$^{-1}$. Then U'VU=I. Therefore $$\frac{P(b = +1 \mid Y)}{P(b = -1 \mid Y)} = \frac{\det(V + (Y - K)(Y - K)')^{-\frac{k+M}{2}}}{\det(V + (Y + K)(Y + K)')^{-\frac{k+M}{2}}} \quad (21)$$

$$= \frac{\det(U'(V + (Y - K)(Y - K)')U)^{-\frac{k+M}{2}}}{\det(U'(V + (Y + K)(Y + K)')U)^{-\frac{k+M}{2}}} \quad (22)$$

$$= \frac{\det(I + (U'Y - U'K)(U'Y - U'K)')^{-\frac{k+M}{2}}}{\det(I + (U'Y + U'K)(U'Y + U'K)')^{-\frac{k+M}{2}}} \quad (23)$$

Now apply the singular value decomposition (SVD) to the contents of the innermost brackets. The SVD allows any matrix to be written as the product of an orthogonal matrix, a diagonal matrix, and another orthogonal matrix. The SVD has to be used twice, once for the brackets in the numerator, and once for those in the denominator. This procedure is illustrated by considering the numerator only.

Thus U'Y−U'K is a matrix and the SVD allows the calculation of L, D and R such that LDR=U'Y−U'K (equation 24) where L and R are orthogonal matrices and D is a diagonal matrix. The next seven equations follow in sequence from equation (24).

$$LDR' = U'Y - U'K \quad (24)$$

$$\therefore \det(I + (U'Y - U'K)(U'Y - U'K)')$$

$$= \det(I + LDR'(LDR')')$$

$$= \det(I + LDD'L')$$

$$= \det(LL' + LDD'L)$$

$$= \det(L(I + DD')L')$$

$$= \det(I + DD')$$

In these equations the orthogonality of R forces R'R=I (and similarly for L) and where the last line follows from the fact that det(L)=det(L')=±1 since L is orthogonal and real.

I+DD', however, is a diagonal matrix computed from diagonal matrices, and its determinant is therefore the product of the elements on its diagonal, each of which is cheap to evaluate. Thus it is never needed to know L or R, just D.

Having now discussed the fundamental principle of the decoding procedure, an embodiment of a decoder will now be described with reference to FIG. 16.

Figure 16A:
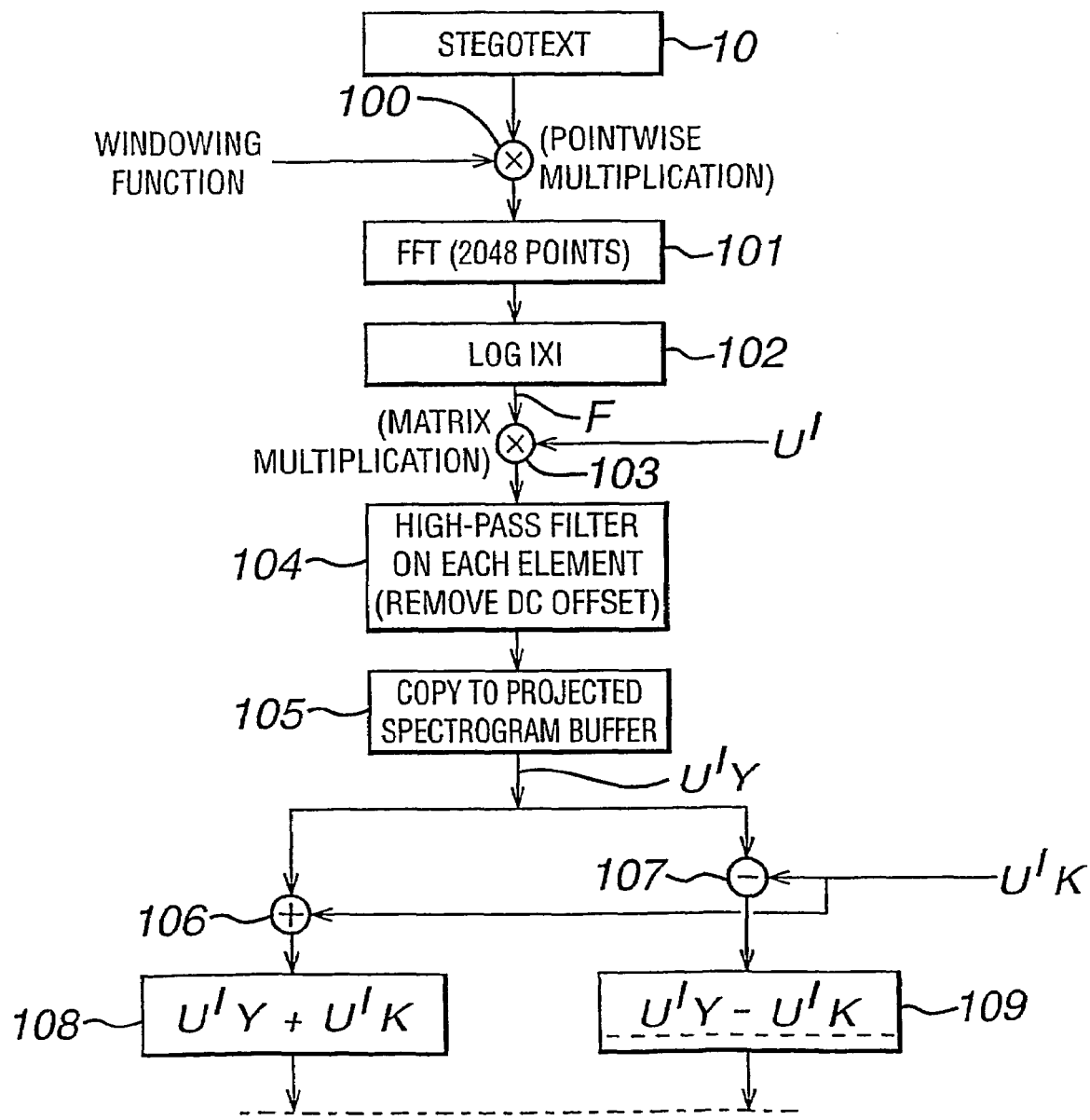
FIG. 16 is a block diagram of one embodiment of the decoder of the system shown in FIG. 1.
Figure 16B:
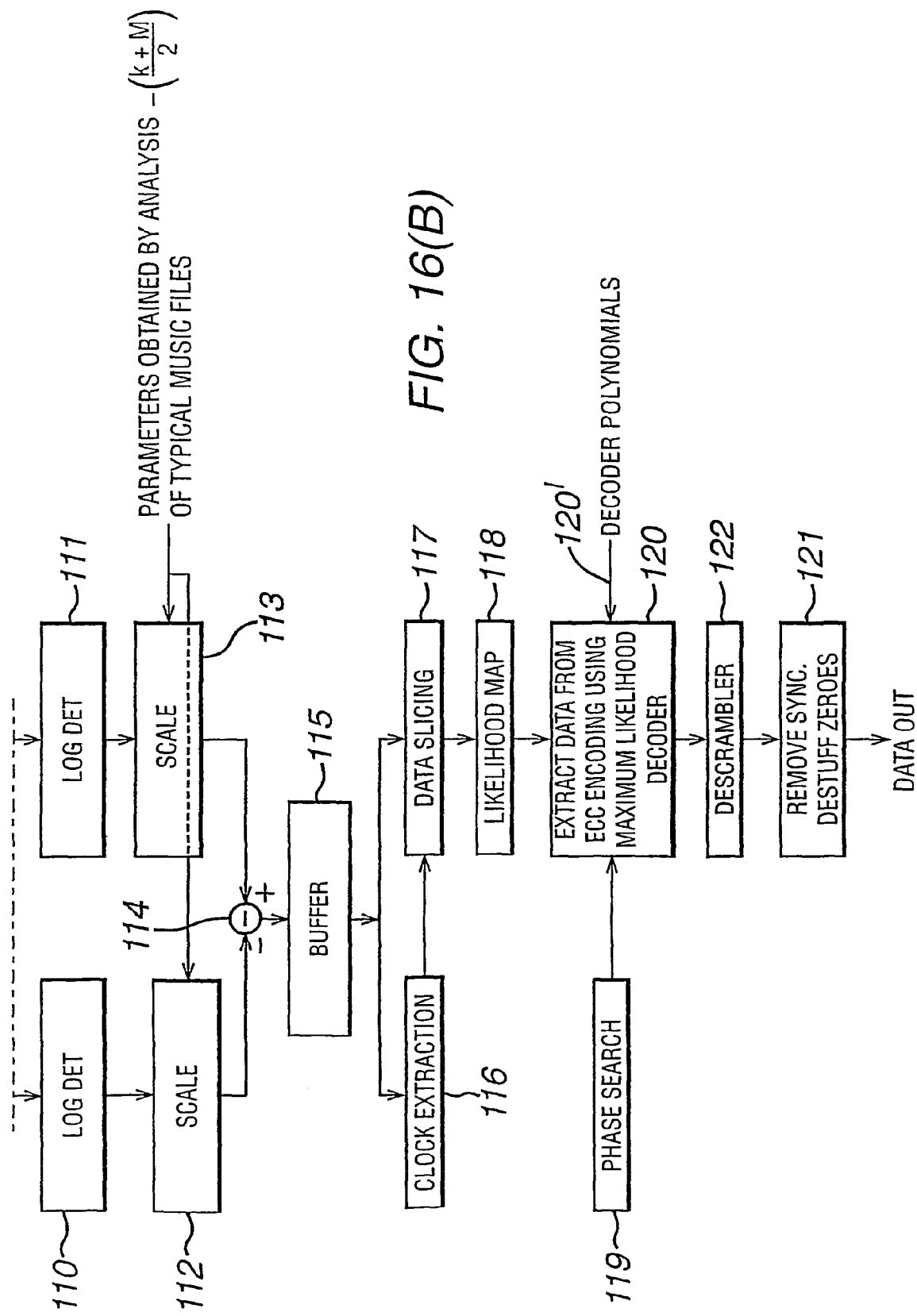

Before discussing the actual decoder of FIG. 16 it is essential to be able to relate the various stages in the decoder to the previous theoretical discussion.

Thus it will be appreciated that Y represents a spectrogram block as received by the decoder and is equal to X+bK where b is the code and K the key. Thus if the value of b and K are known then the probability of a particular value of Y being received is exactly the same probability that Y−bK represents the original covertext. This is what is expressed in equation (8).

Turning now to equation (9) this expresses the probability that X is a spectrogram of unmarked music. In this equation S is an unknown icov matrix. If the music were to be represented as white Gaussian noise S in equation (9) would always be a multiple of the identity matrix. However as discussed this is not an accurate representation of real music. This is the reason for the use in the present invention of the icov matrix.

Thus it is assumed that each column of X, though not of the whole piece of music, comes independently from the same multi-dimensional Gaussian distribution defined by this, as yet unknown, icov matrix S. Thus the decoder operates on the assumption that S may be different in different parts of the music. Equation 9 expresses the above paragraph mathematically.

However in order to decode the marked spectrogram it is essential to know what values of X are likely. Equation 9 can only provide this information if the value of S is known.

Thus the function of equation 10 is to determine what values of S are likely. In this equation it is assumed that S is distributed according to a Wishart distribution with parameters V and k. The method by which these parameters are chosen will be described later in the specification.

Having discussed the basic principles involved a first embodiment of a decoder will now be described with reference to FIG. 16 of the accompanying drawings.

In FIG. 16 a music-based stegotext is again represented by (15). The following description will only refer to music in the interests of simplicity but of course other forms of covertext can be handled in a similar manner.

Figure 6:
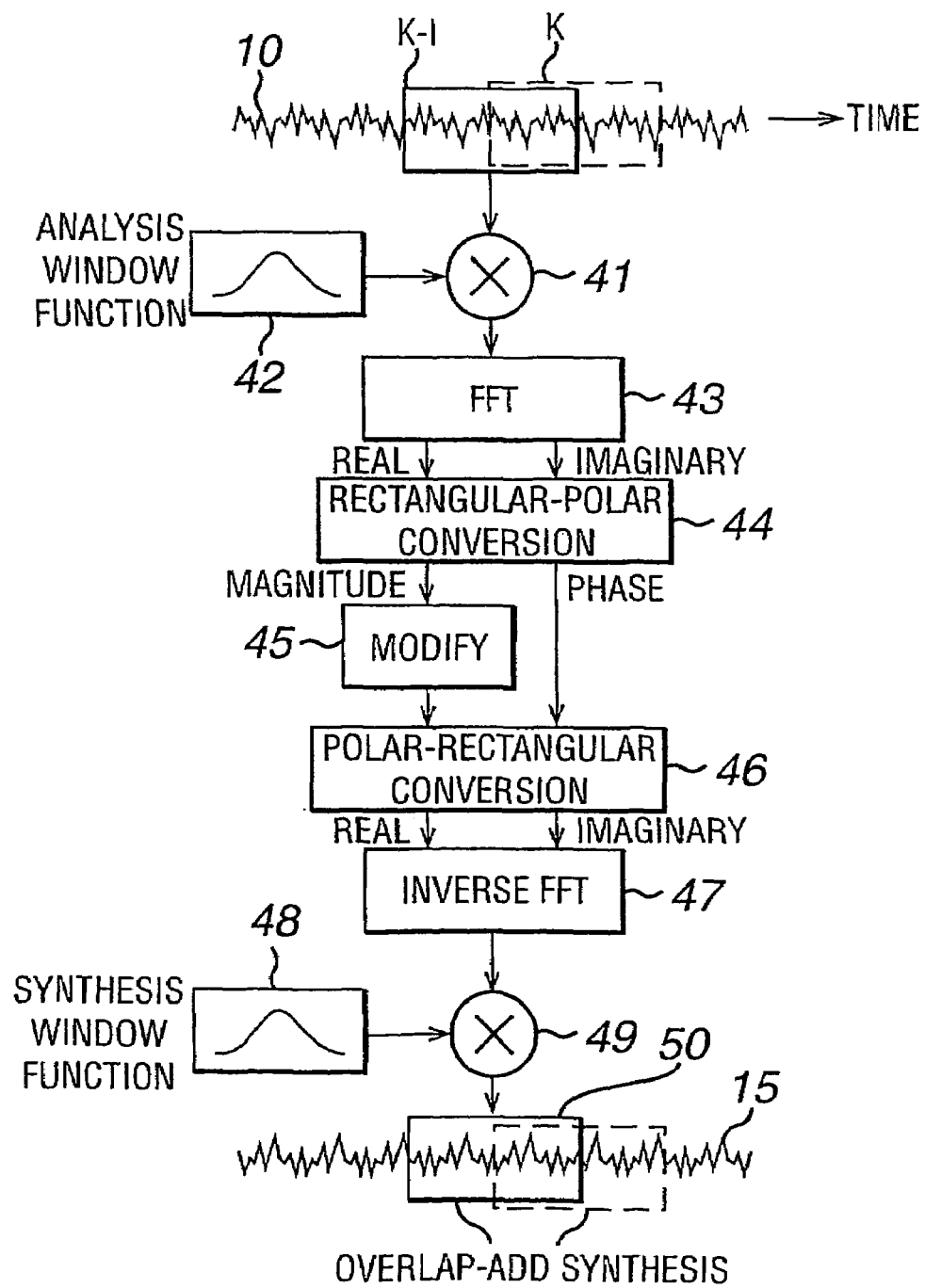
FIG. 6 is a block diagram of an encoder/decoder shown in greater detail than the embodiment of FIG. 2.

At (100) the covertext is point-wise multiplied by a windowing function comparable to the windowing function disclosed at (51, 52) of FIG. 6, and at (101) the Fast Fourier Transform of the windowed stegotext is generated and this is converted at (102) into the log domain.

At (103) the output of (102) is pre-multiplied with a matrix U' which has already been generated so as to represent the matrix U' shown in equations 22 to 25. The generation of U' will be described later. If the output of (102) is defined as F then the output of (103) is UI*F and this is applied to a high pass filter (104) to remove any DC offset. The output of U'*F of (104) is a log abs spectrogram of a length dependent on the initial stegotext.

In order to process this spectrogram it is sectioned into blocks each having a width corresponding to K. In the present and second embodiments each block is 32 columns wide in the time dimension and 1024 rows in the frequency dimension, though these values can of course be varied. Each sectioned block represents U'Y as in the set of equations 23, 24 and 25.

This sectioning is carried out at (105) in such a manner that each section block overlaps the previous block by one column less than the width of the block in correspondence to the situation illustrated in FIG. 4 of the accompanying drawings.

Each block obtained in the above manner is added at (106) to U'K and at (107) has U'K subtracted from it so as to give two different results at (108) and (109), namely: (1) Left Hand: $X_{-1}=U'Y+U'K$ and (2) Right Hand: $X_{+1}=U'Y-U'K$.

It will now be appreciated that these values correspond to values found in equations 23 and 24.

The next stage of the decoder involves calculating the logarithm of the denominator and numerator respectively of equation 23. This is achieved using the equation set out at 24. At stages (110, 111) the log determinants of the denominator and numerator of equation 23 are determined and at stages (112, 113) the output log determinants are respectively scaled by $$-\left(\frac{k+M}{2}\right),$$

this factor of course also appearing in the above equations. The derivation of this factor will be described hereinafter.

At stage (114) the logarithm of the quantity of equation 23 is calculated by subtracting the logarithm of denominator from the logarithm of the denumerator as represented by the scaled values obtained at (112) and (113).

The values so obtained are stored in a buffer (115) as a log ratio of the probability of the data bit of interest if one is present being a 1 or a −1. Thus buffer (115) can be considered as holding the posterior probabilities of a sequence of code bits, the length of the sequence depending on the size of the buffer.

Figure 17:
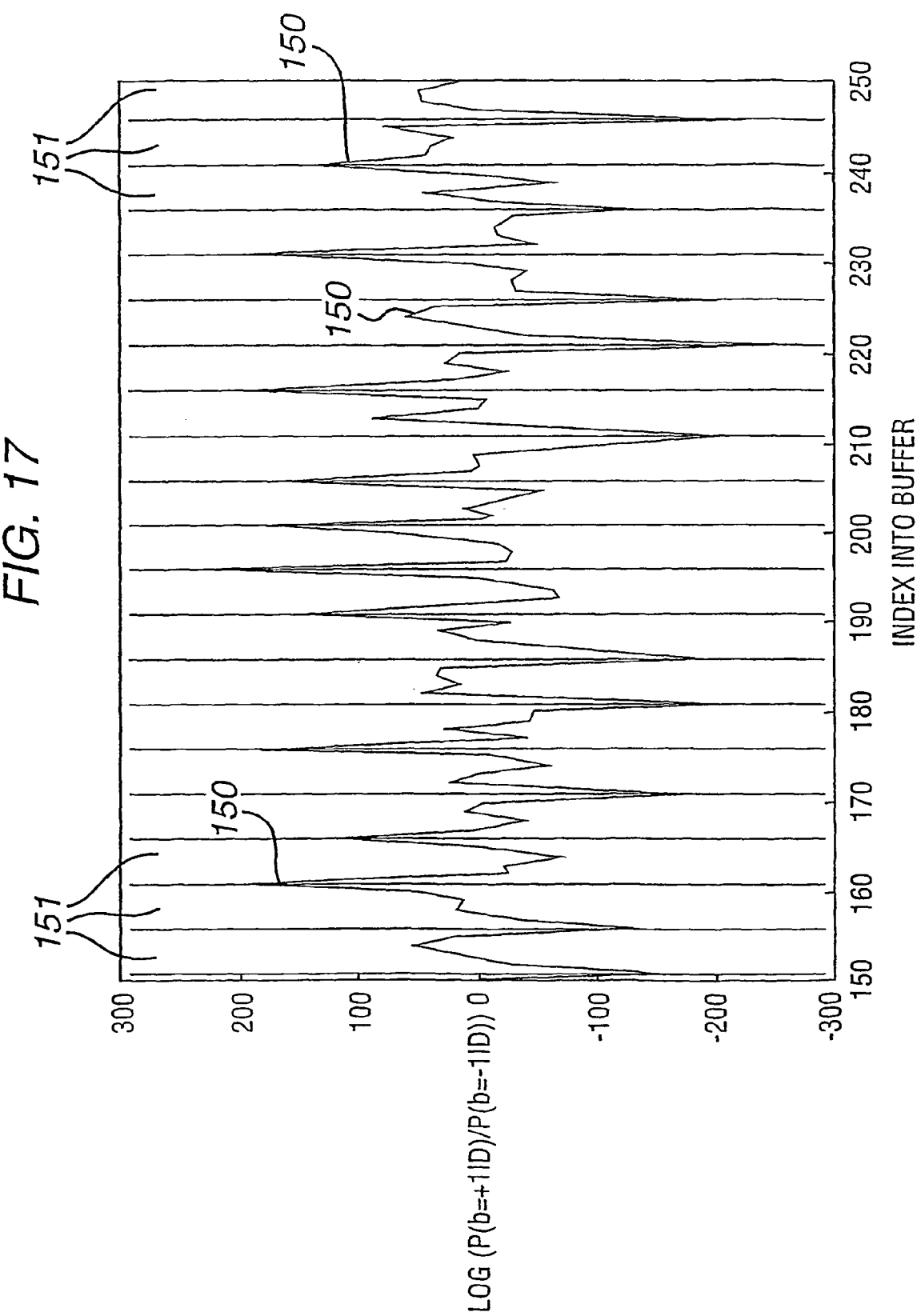
FIG. 17 is a graph indicating the contents of a buffer of the decoder of FIG. 16.

If one considers a sequence of individual entries into the buffer (115) these will consist of values distributed about a zero axis with each value representing the outcome of the processing, as just described, of a matrix. The buffer (115) can hold 256 discrete values, though of course this number is also variable. FIG. 17 is a graph indicating a sequence of values as stored in buffer (115).

The values in the buffer (115) are represented by the dark curve (150). The solid vertical lines 151 represent the times at which the bits have been encoded. These times are determined by the clock extraction circuit (116) in the manner described hereinafter.

It is now necessary to extract from the buffer (115) those values which represent the original code. It must again be appreciated that the original stegotext may have undergone either stretching or compression so that the extraction of a bit rate for the code must take this into account.

This is the procedure which is carried out at clock extraction circuit (116). Here all possible sequences of slicing points are considered and that sequence of points which gives maximum total deviation from zero is selected as the clock for the embedded code.

Effectively a pair of nested loops iterates over the possible bit clock frequencies and phase off-sets. In each iteration, the sum of the squares of the sliced values is calculated. The values of frequency and phase which maximise this sum are returned to stage (117) as a set of indices representing a clock.

In stage (117) two pointers are used to point to where the first and last values are expected to be found in the buffer (115). These are manipulated to allow the data to be sliced from block to block stitching together the extracted bits without gaps and repeats. The posterior probability vector is shifted along at the same rate as the data in spectrogram buffer (105).

The clock generated by clock extraction circuit (116) is used at (117) to slice the data that is to be read the data from buffer (115) into a buffer stage (118). It will be appreciated that the original key was added at 5 column intervals to the 32 columns of the log ab spectrogram of the covertext. Thus even if the stegotext has been compressed or stretched prior to decoding a code bit will be expected approximately every fifth column of the sequence of values stored in the buffer. However the result of slicing the buffered data in response to the extracted clock is still not a sufficiently accurate representation of the original code as so far the decoder has assumed that the music has a detv distribution. As already described this is not completely true. Thus certain of the points at the 5 column intervals may be wrong. Accordingly allowances have to be made for the original music not being a detv distribution.

Consider first the output to stage (118). This consists of a sequence of values which purport to be $$\log\left(\frac{P(b_n = 1 \mid Y_n)}{P(b_n = 0 \mid Y_n)}\right)$$

This would be the required sequence if the music actually had a detv distribution. However as already explained it does not.

If $C_1, C_2 \ldots C_n$ is defined as the sequence of values output from stage (117) then if the music does have a detV distribution then $$C_n = \log\left(\frac{P(b_n = 1 \mid Y_n)}{P(b_n = 0 \mid Y_n)}\right)$$

As the music does not have a detv distribution it is necessary to find a function f such that $f(C_n)$ is a better approximation to that logarithm than $C_n$ so that a more correct sequence can be input to the error correcting decoding stage (120) of the decoder, it being appreciated that in the encoder the watermark code was in addition encoded with an error correcting code.

The output of the data slicing stage (117) is a series of values on either side of zero with the positive values potential "+1"s and the negative values potential "−1"s.

Each of the "+1" values will deviate about a value which will be referred to as α. Similarly each of the "−1" values will deviate about −α and α can be estimated to equal the mean of the absolute values of $C_n$ i.e. α−mean|$C_n$|.

The amount by which the positive $C_n$ varies about α and the negative $C_n$ varies about −α also has to be estimated. This value is defined as σ so that σ=std(|$C_n$|−α)

Having now obtained σ the original values $C_1, C_2 \ldots C_n$ are scaled in stage (118) so that they have a standard deviation of 1 about +or $$-\frac{\alpha}{\sigma}.$$

This is summarised by the equations $$a_n = \frac{C_n}{\sigma}$$

and $$\beta = \frac{\alpha}{\sigma}.$$

Thus if $h_n=|a_n|-\beta$ then $h_n$ has mean zero and a standard deviation of 1 but is not necessarily Gaussianly distributed.

In the present embodiment it is assumed that $h_n$ is a one dimensional Student distribution of the type which has already been discussed. Thus $$P(h_n \mid r, m) = r^m \frac{\Gamma\left(m + \frac{1}{2}\right)}{\sqrt{2\pi}\,\Gamma(m)} \frac{1}{\left(r + \frac{1}{2} h_n^2\right)^{m+\frac{1}{2}}} \quad (25)$$

Accordingly $$\frac{P(b_n = \text{sign}(C_n))}{P(b_n \neq \text{sign}(C_n))} = \frac{P(h_n = -\beta + \mid a_n \mid)}{P(h_n = -\beta - \mid a_n \mid)} = \frac{\left(r + \frac{1}{2}(-\mid a_n \mid - \beta)^2\right)^{m+\frac{1}{2}}}{\left(r + \frac{1}{2}(\mid a_n \mid - \beta)^2\right)^{m+\frac{1}{2}}} \quad (26)$$

From equation 26 it follows that the required $$f(c_n) = \log\left(\frac{\left(r + \frac{1}{2}(-a_n - \beta)^2\right)^{m+\frac{1}{2}}}{\left(r + \frac{1}{2}(a_n - \beta)^2\right)^{m+\frac{1}{2}}}\right) \quad (27)$$

The derivation of the values r and m will now be described. This is done by collecting a large sample of the values of $h_n$ typically seen in practice and doing MAP inference using equation (25) as the likelihood of individual values of $h_n$ and improper uniform prior distributions on m and log(r).

Accordingly in stage (118) equation 28 is used to calculate the corrected sequence which finally has to have the added error correction encoding decoded so as to obtain what is referred to as a "likelihood" map containing vectors of calculated log likelihood ratios.

FIG. 18 shows the log likelihood map derived from the contents of buffer (115) by the procedures which have just been described. Reference numerals 150, 151 are used in FIG. 18 in the same sense as in FIG. 17.

The final stages of the decoder of FIG. 16 are conventional.

The convolutional encoder shown in FIG. 5 generates two output bits for each input code bit.

Therefore for every two bits present in the output of circuit (118) a decision has to be made as to which bit is part of the desired code.

In order to carry out this function the convolutional decoder (120), in its simplest form, looks at each potential output bit, and for each such bit considers all the possible values of the surrounding bits within a fixed window. This procedure is carried out in phase search circuit (119). The size of the window is a compromise between performance and amount of calculation. For example for a window encompassing ten values in the buffer a total of 1024 sequences have to be evaluated.

For each of the 1024 sequences the encoded value is calculated and the probabilities that values in the buffer over that window are calculated by adding or subtracting the relevant values in the buffer in accordance with the relevant bit being +1 or −1.

The probabilities of all the 512 sequences which have a +1 in the position under consideration are added, and the other 512 sequences which have a zero in the relevant position are added. This gives a probability that the bit under consideration is a 1 or a 0.

This procedure is illustrated in FIG. 19 in this figure (250) in a schematic representation of the values sliced from circuit (118). $Win_i$ represents a ten-value window and 7 represents the pixel of interest. $Win_{i+2}$ represents the next window in this sequence and 8 the next pixel of interest value. Finally $V_i$ represents the result of the evaluation just carried out for the pixel of interest 7 and $V_{i+2}$ the outcome of the next evaluation.

As shown in FIG. 19, because the output of the convolutional encoder of FIG. 5 gave 2 output bits for each code bit, the window is stepped at two bit intervals along the contents of the buffer. This procedure has to be carried out twice over the respective odd and even numbered values in the buffer. Two sequences are thus generated each having a probability associated with it and finally a selection is made on the basis of the sequence which has the higher probability.

What has just been described is the simplest form of encoder/decoder.

However it may be advantageous to have some other ratio other than 2 to 1.

If for example the ratio was 4 to 1 it would be necessary to use four sequences in which a window was successively stepped evenly for values in the buffer, and to select the most probable output bit from these four sequences.

Equally there are other ways in which the code can be decoded which will be apparent to people skilled in the art such as a Viterbi decoder.

Decoder polynomials corresponding to those used at the encoding stage are supplied to the maximum-likelihood decoder 120 at 120', and finally added synchronisation bits and zeros added during zero stuffing are removed at (121) to leave the decoded data. The descrambler (122) is only necessary if the optional scrambler (65) in FIG. 13 has been used in the encoding process.

Figure 20B:
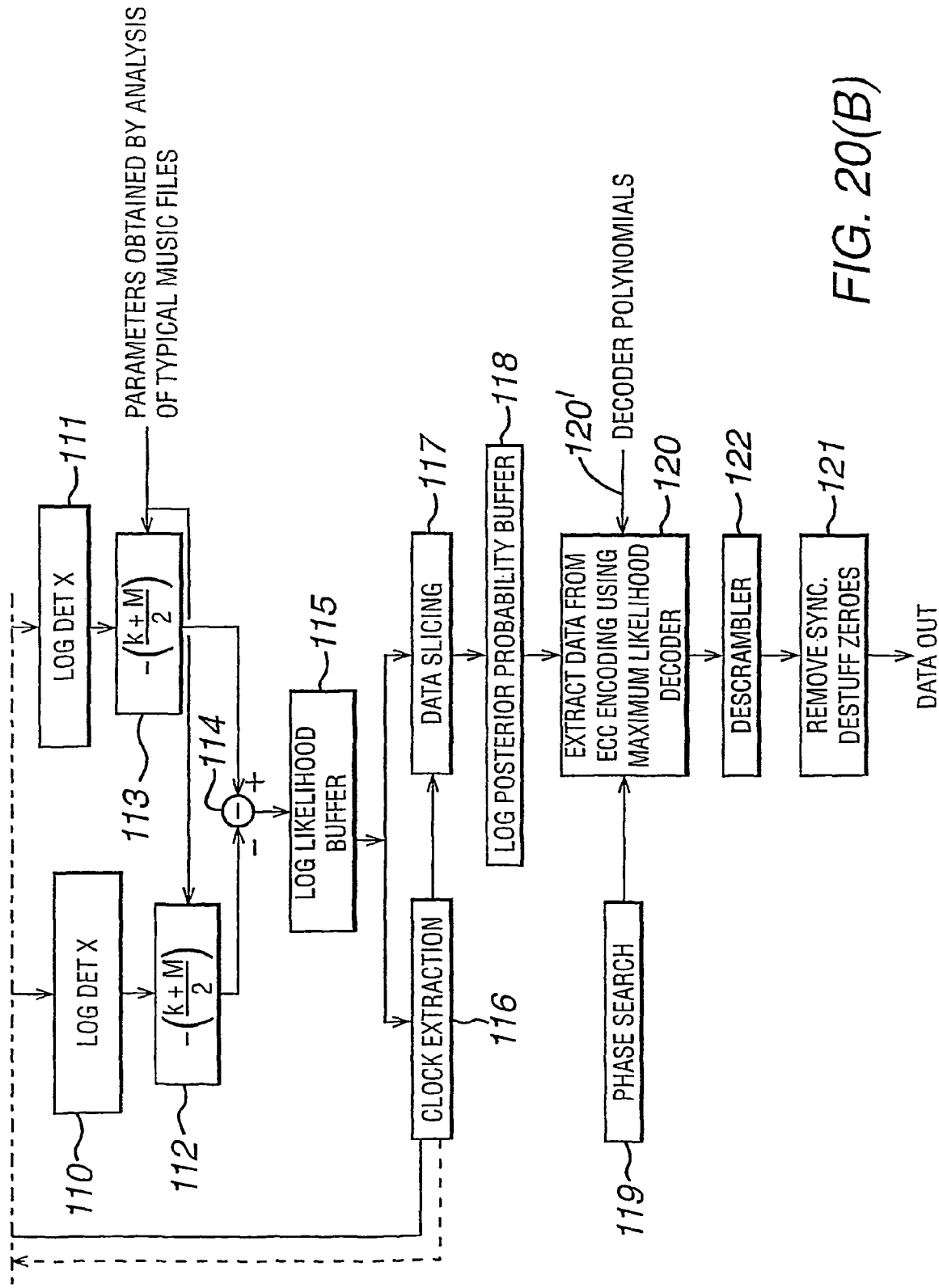
FIG. 20 shows a second embodiment of a decoder.

FIG. 20 of the accompanying drawings shows another embodiment of a decoder. It will be seen that the decoder of FIG. 20 has the bulk of its integers common to the decoder of FIG. 16. Thus where these common integers occur the same reference numerals have been used.

Figure 21:
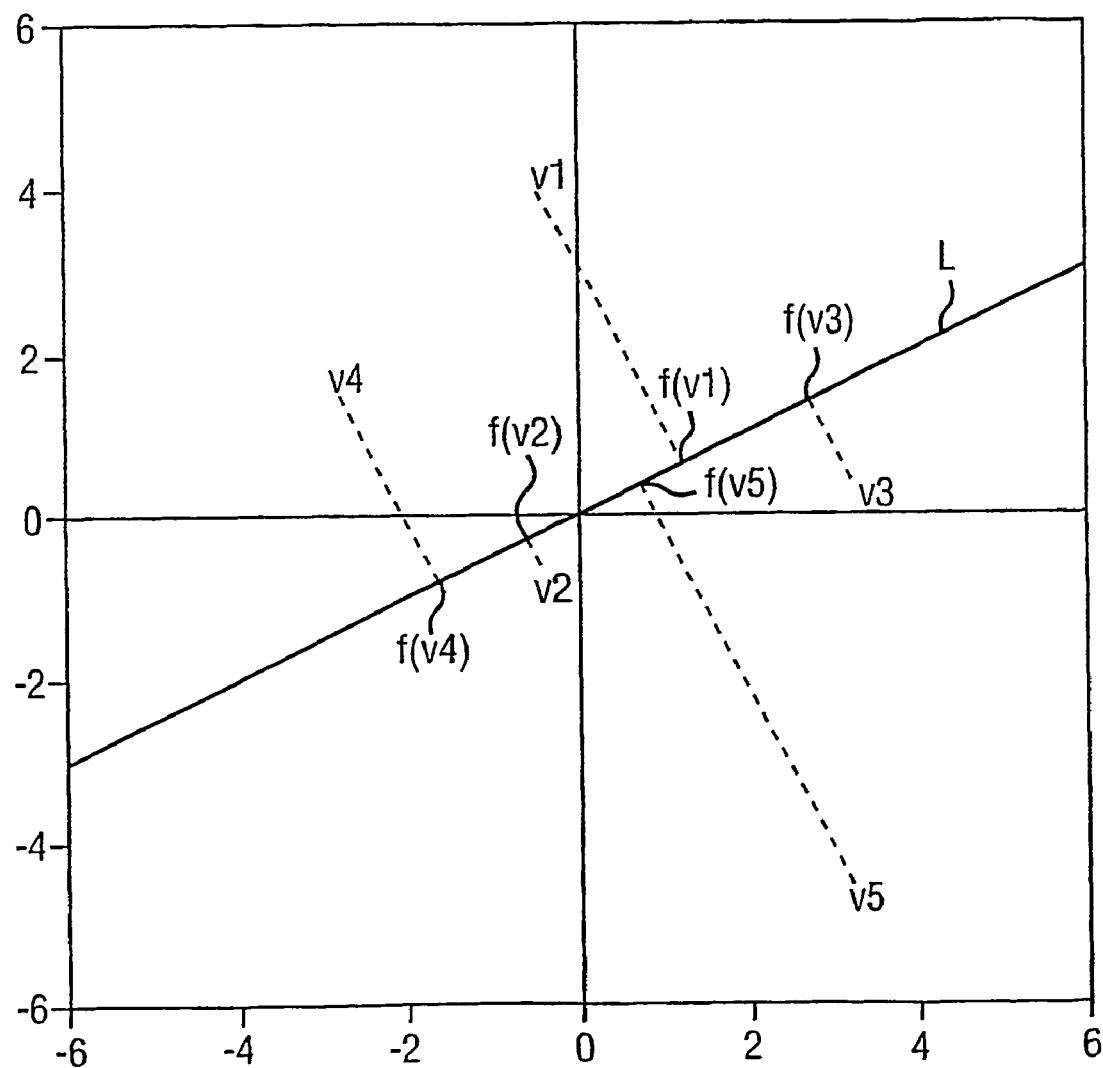
FIG. 21 is a graph illustrating projection maps in vector spaces.

Fundamental to the operation of the decoder of FIG. 21 is the concept of projection maps in vector spaces.

FIG. 21 of the drawings illustrates an orthogonal projection map f from a two-dimensional vector space onto a one-dimensional subspace.

In this figure a random set of points $v_1$, $v_2$, $v_3$, $v_4$ and $v_5$ have been mapped by a function f onto a single line, namely the diagonal line marked L.

In general terms let v be a real N-dimensional vector space with a dot product written $v_1.v_2$. A projection map on V is a function f.V-V which satisfies the following equations.

$$rf(v)=f(rv)$$

$$f(v_1+v_2)=f(v_1)+f(v_2)$$

$$f(f(v))=f(v)$$

for any $v_1$, $v_2$, $v_3 \in$ v and for any real number r. It is said to be an orthogonal projection map if in addition $f(v_1)=0 \Rightarrow v_1 \cdot f(v_2)=0$, for any $v_1$, $v_2 \in$ V.

A subspace W of V is a subset of V such that $rw_1+w_2 \in$ W for any $w_1$, $w_2 \in$ W and any real number r. For each subspace W of V there is exactly one orthogonal projection map $f_w$ onto W.

For example N might be 2, v the set of all real 2-vectors, and w the set of all 2-vectors whose first element is twice the second element. In FIG. 19 W is represented by line L and the random points are joined by dotted lines to their images in W under $f_w$.

It will be appreciated that the embodiments of the present invention which have been described such as the encoder of FIG. 13 and the decoder of FIG. 16 all operate on the basis that matrices of values in the log abs spectrogram are being manipulated so that any manipulation of the matrices which reduces computational requirements but retains the information necessary in particular for the extraction of the code from the stegotext would be of considerable value. The above described concept of projection maps in vector spaces provides such a tool. Thus if A is a matrix whose columns span W, then there is a matrix B such that $f_w(v)=Bv$.

The following is one example of how the necessary projection matrix can be calculated using the Matlab (RTM) programming language.

If A is a matrix whose columns span W, then there is a matrix B which may be calculated by the following Matlab statements such that $f_w(v)=Bv$.

[L, D, R]=svd(A);
 % get an orthonormal basis L for V
 % whose first few columns are an
 % orthonormal basis for W
% now replace the non-zero elements on the diagonal of D by 1
% and pad D up with zeros to be the same size as L
 d=diagfrom(D);
 dnnz=sum(dkey>1e−10*dkey(1));
 D1=diagsz (ones(dnnz, 1), size (L));
% B operates by calculating the components of any v in V
% in the basis L, zeroing the components orthogonal to V,
% then going back to the original coordinate system.
 B=L*D1*L';
If the last line of these statement is replaced by $B_0$=L(:, 1: dnnz)';

Thus $B_0$ not only carries out the projection map $f_w$ but it also switches to an orthonormal coordinate system for W which has fewer dimensions than the original coordinate system for V with of course the unimportant exception that W=V.

When discussing the decoder of FIG. 16 and the equations associated with the operation of this decoder it will be remembered that U'Y represented a log abs spectrogram of a segment of the stegotext as modified by statistics of prior calculated statistics of samples similar to the covertext. If W denotes the subspace spanned by the columns of U'Y and this received data is projected orthogonally onto W as discussed in the simple example of FIG. 21 then the necessary calculations to extract the watermark code, can be substantially simplified if the projection of Y onto the new subspace does not result in the loss of too much information.

It has been discovered that carrying out such a projection does little to damage the robustness of the stegotext to attack.

Thus again considering equation 25 it will be seen that by carrying out the projection $B_0$ it is now necessary to evaluate det(I+($B_0$U'Y−$B_0$U'K)($B_0$U'Y−$B_0$U'K)') where $B_0$ is the matrix related to $f_w$ as already discussed with reference to FIG. 20.

In order to carry out this evaluation $B_0$U' can be precomputed along with $B_0$U'K and stored in ROM.

The next steps to be undertaken are the evaluation of T=($B_0$U')Y−($B_0$U'K), evaluating I+TT', and taking a Cholesky decomposition such that C'C=I+TT' noting that det (I+$B_0$U'Y−$B_0$U'K)($B_0$U'Y−$B_0$U'K)')=det(C)$^2$.

det(C)$^2$ is easy to evaluate since C is triangular.

Once the above has been appreciated it is now possible to discuss the differences between the encoder of FIG. 20 and the encoder of FIG. 16.

In FIG. 20 the dotted box (124) represents a controllable resampler circuit which is only present in a variant of the embodiment which will be described hereinafter. Additionally the dotted connecting line between box (124) and circuit (116) is only present in the variant to be described. K as before represents the key which was originally used to encode the covertext. As already described this key has been generated using random white noise in turn generated by a random integer seed number and then being filtered by a 2D swept band pass filter.

A matrix multiplier (201) matrix multiplies the key K, held in a ROM (202) with the already mentioned predefined statistical data U' to generate U'K. This data U' is stored in a ROM (203). The output of multiplier (201) is supplied to box (204) which generates the projection matrix $B_0$ and this projection matrix is multiplied by multiplier (205) with the output of multiplier (201) to generate $B_0$U'K. Additionally $B_0$ as output by (204) is also supplied to one input of a matrix multiplier (206) the other input of which is supplied with U' so that the output of mutliplier (206) is $B_0$U'.

The decoder of FIG. 20 now operates in a manner which is analogous to the decoder of FIG. 16 and those elements of the encoder of FIG. 20 which operate in the same manner as the element of the encoder of FIG. 16 have been given the same reference numerals.

Thus at multiplier (103) each block of Y as already defined is multiplied by $B_0$U'. Similarly at (106, 107) the value $B_0$U'K are respectively added and subtracted rather than U'K.

The remaining elements of the second embodiment of the decoder operate on exactly the same manner as those of the first embodiment.

Figure 22:
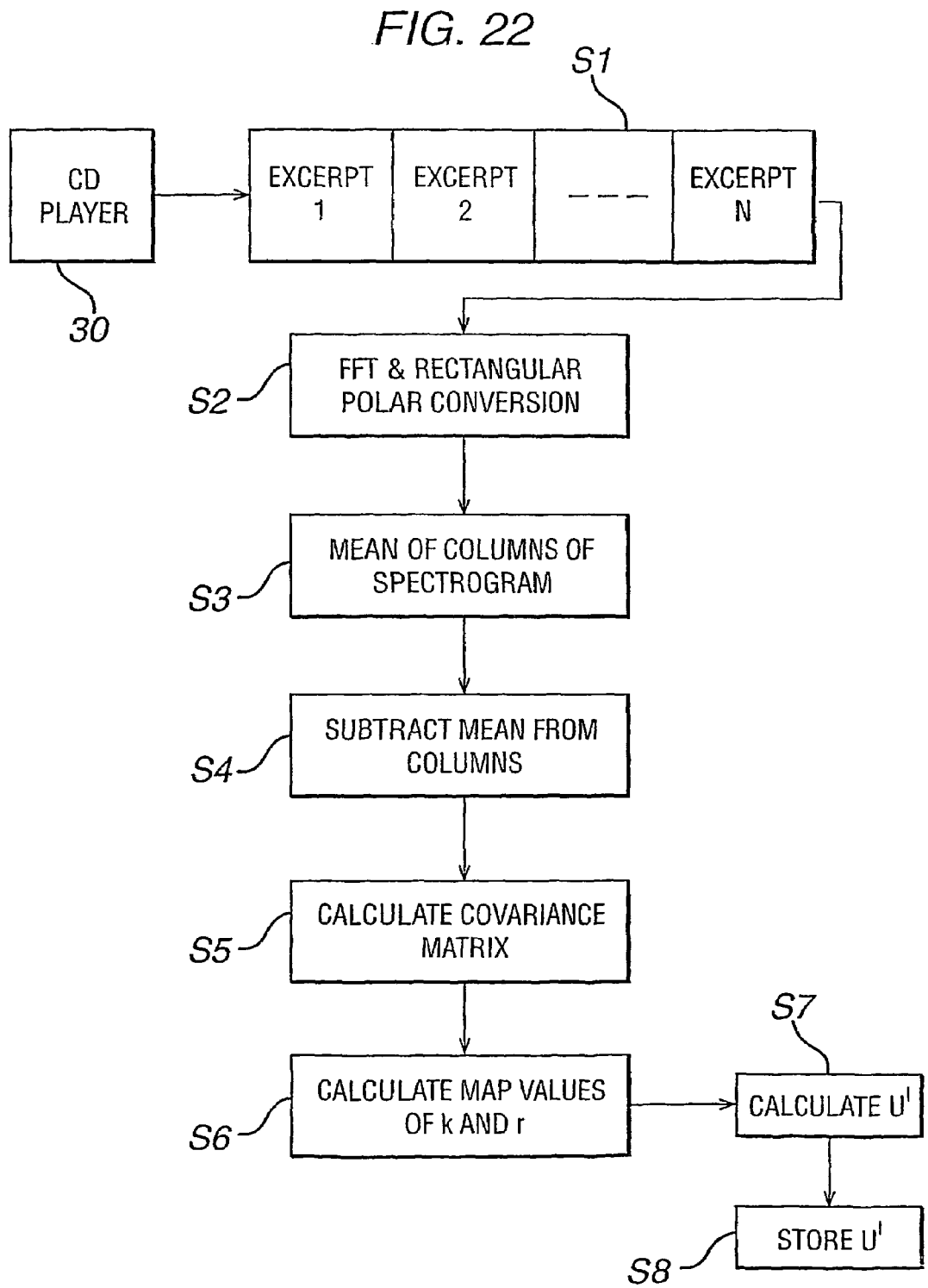
FIG. 22 illustrates the generation of parameters relating to music for use in the decoders of FIGS. 16 and 20.

It is now necessary to describe the procedure by means of which the prior statistical values required by the Bayesian processes of the two embodiments of the encoders which have just been described. These will be described with regard to the flow diagram of FIG. 22.

In step S1 of this figure a plurality of musical examples are concatenated. The musical samples can be chosen from a wide range of music and for example can be generated by playing excerpts from a suitable number of CDs. The CD excerpts can be mixed with or replaced by taped, live or broadcast music.

The end result of this concatenation is a length of music excerpts which can cover a wide music range. It is of course possible to skew the music excerpts chosen so that the statistical data could be based on different types of music so that a user can select an appropriate set of data for decoding purposes. Thus several different sets of statistical data could be stored in ROM (203) and an appropriate selection made by a user.

At step S2 the log power spectrogram of the concatenated musical examples is generated. At step S3 the mean of the columns of the power spectrogram so obtained is calculated and in step S4 this mean is subtracted from the individual columns yielding A.

The latter two steps can be approximated by passing the rows of the spectrogram through a high-pass filter with appropriate characteristics.

At step S5 the covariance matrix E for the values obtained from step S4 is generated thus:

$$E = \frac{AA'}{N}.$$

At step S6 it is assumed that each column had been drawn independently from a detV distribution of the type already discussed with Wishart parameters with r*E for the scale matrix and k for shape parameters. It is also assumed that log r has an improper uniform prior distribution and k has an improper uniform prior distribution. In step S6 the MAP (Maximum A Posteriori) values of y and k are calculated using Bayes Theorem.

In step S7 V is set to equal rE and k=k and these values are used to calculate U'. U' is accordingly a matrix which transforms the mean local covariance matrix of the log power spectrogram of the samples into the identity matrix. Finally in step S8 U' is stored.

A number of variants of the encoder shown in FIG. 20 will now be described.

It is possible that extracting the MAP values of the timing frequency and phase from buffer (115) may not result in the most accurate performance. Accordingly in a variant of the two decoders described all possible ranges of timing frequency ω and phase φ are considered. For each ω and φ there is estimated the posterior probability P(ω,φ|D) of ω and φ given the data D by adding the absolute values of the values sliced from buffer (115) where the slicing is done according to ω and φ, and exponentiating the result.

In the previously described decoders the values of ω and φ which maximised P(ω,φ|D) were then used to slice the values in buffer (115).

Instead in the variant being described the audio input is initially resampled by resampler circuit (123) so as to either stretch or compress the stegotext. Then a random sample is drawn from P(ω,φ|D) by a random sampler which replaces the clock extraction circuit (116) and this random value is used to slice the data in buffer (115). This procedure takes into account the fact that the MAP may occur as a narrow high spike in the distribution when in fact the true value belongs to a broader peak which although lower contains more probability.

Thus consider the manner in which the random sampling of buffer (115) in circuit (116) as just described operates in conjunction with the resampler (123).

Firstly if the stegotext has been stretched (compressed) by less than 6% then it is likely that circuit (116) will immediately select an appropriate timing for data slicing circuit (117) due to the nature of the key (K), and similarly output a correct correction value to circuit (123) so as to undo the stretch (compression) which has been detected.

If on the other hand the stretch (compression) was greater than 6% then values in buffer (115) and hence the calculated values of P(ω,φ|D) will be incorrect and all of similar magnitude. This results in a random value being fed to the resampler circuit. Two cases now need to be considered. Firstly the value fed back is by chance within 6% of the correct value. If the total range of stretch possible is ±10% then the chance of this happening is at least ½. Once the newly resampled stegotext reaches buffer (115) circuit (116) will be able to determine the correct correction now needed. From here on the correct value will be fed back to circuit (123) and on to circuit (117).

Secondly the value fed back to circuit (123) may be outside ±6% of the correct value. If this once again is incorrect the next value fed back will be randomly chosen and the procedures described continue. As at each iteration there is a ½ probability of picking up the correct value so that only a few iterations are required until the correct timing and phase have been estimated. Naturally the resampler circuit may start by leaving the input stegotext unaltered.

Finally a common problem with all decoders dealing with precisely reproduceable inputs is that under certain circumstances a particular input may not be decoded correctly, and in the absence of any randomness in the input the same problem will recur whenever the input is repeated. It is accordingly proposed to provide a decoder such as, for example, the decoders and their variants which have just been described with respect to FIGS. 16 and 21 with means for avoiding this problem.

A number of solutions are possible. One is merely to add truly random noise to the input to the decoder. This has the disadvantage of degrading the performance of the decoder.

Another alternative is to precede the actual input to be decoded with a period of zero signal or of random noise, the period having within a predetermined range a truly random length.

It will be appreciated that in the foregoing specification the various embodiments of encoders and decoders have been defined in terms of circuit elements such as "filter", "multiplier", "buffer", and "circuit" and so on. However apart from the actual recording or reproduction of a signal all these circuit elements can be replaced by appropriate software manipulation. Thus in particular the encoder described with respect to FIG. 13 can be replaced in all its functional aspects by a general purpose computer receiving appropriate code. An example of such a code is given with regard to the generator of the matrix $B_0$ used in the decoder of FIG. 20. Thus all the steps and blocks shown in FIGS. 13, 16 and 20 can have their functions carried out as software steps.

In the case of the decoder embodiments if they are to be used in individual systems which as well as decoding the stegotext produce the stegotext as an output, for example as music, then the decoders may well be in the form of integrated microprocessor(s) possibly employing very large scale integrated circuits.

The invention claimed is:

1. An encoder for encoding a covertext signal to generate a stegotext, the encoder comprising:
   a first Fast Fourier transformer for carrying out a Fast Fourier Transform and rectangular polar conversion of the covertext signal so as to transform the covertext signal into a log power spectrogram;
   a key provider for providing at least one key, the or each key being in the form of a two-dimensional pattern of predetermined size;
   a multiplier for adding or subtracting in the log power spectrogram domain multiples of the key or multiples of one or more of the keys if there is a plurality of keys, to blocks of the transformed covertext signal;
   a controller for controlling the addition or subtraction of the key or keys by the multiplier in accordance with data representing a desired code; and
   a second Fast Fourier transformer for carrying out polar rectangular conversion and inverse Fast Fourier Transformation of the modulated covertext signal to generate a stegotext.

2. An encoder according to claim 1, wherein said first Fast Fourier transformer is adapted to segment the covertext into overlapping segments prior to carrying out the Fast Fourier Transformation and rectangular polar conversion, and including a multiplier for multiplying each segment of the covertext with a function so that each segment tapers at its ends, a converter for converting each segment into the log power spectrogram domain to generate blocks which are of the same length and have the same number of columns as the two-dimensional key, said second Fast Fourier transformer in addition being adapted to carry out polar rectangular conversion and inverse Fast Fourier Transformation on each modulated block of the covertext signal and to synthesise the resulting segments to generate the stegotext.

3. An encoder according to claim 2, wherein each block of the log power spectrogram of the covertext signal is x columns wide, and the multiplier is adapted to apply the key to the blocks in steps of T, where T is an integer number of columns of the key, so that the key is applied at least in part, approximately 2x/T times to each spectrogram block.

4. An encoder according to claim 1 and including an error correction convolution encoder for error correction encoding the desired code before the data is used to control a watermarking of the covertext.

5. A method of encoding a covertext signal to generate a stegotext, the method comprising:
   carrying out a Fast Fourier Transform and rectangular polar conversion of the covertext signal so as to transform the covertext signal into the power spectrogram domain;
   providing at least one key, the or each key being in the form of a 2-dimensional pattern of predetermined size;
   adding or subtracting in the log power spectrogram domain multiples of the key or multiples of one or more of the keys if there is a plurality of keys, to segments of the transformed covertext signal;
   controlling the addition or subtraction of multiples of the key or keys at the addition/multiplication step in accordance with data representing a desired code; and
   carrying out polar rectangular conversion and inverse Fast Fourier Transform of the modulated covertext signal to generate a stegotext.

6. A method according to claim 5, comprising segmenting the covertext into overlapping segments prior to carrying out the Fast Fourier Transformation and rectangular polar conversion, and multiplying each segment of the covertext with a function so that each segment tapers at its ends.

7. A method according to claim 5, wherein each segment of the covertext is converted into the log power domain to generate blocks which are of the same height and have the same number of columns as the key, and wherein each block of the log power spectrogram of the covertext signal is x columns wide, and the multiplier is adapted to apply the key to the blocks in steps of T, where T is an integer number of columns of the key, so that the key is applied, at least in part, 2x/T times to each spectrogram block.

8. A method according to claim 5, wherein the transformation of the modulated covertext signal into the stegotext is by carrying out polar rectangular conversion and inverse Fast Fourier Transformation on each modulated block of the covertext signal and synthesising the resulting segments, and wherein each segment resulting from the polar rectangular conversion and inverse Fast Fourier Transformation is multiplied with a function so that each segment tapers at each end prior to synthesis to generate the stegotext.

9. A storage medium storing processor implementable instructions for controlling a processor to carry out the method of claim 5.

10. An electrical signal carrying processor implementable instructions for controlling a processor to carry out the method of claim 5.

11. A storage medium storing in readable format a stegotext encoded by the method of claim 5.

12. A signal carrying a stegotext encoded by the method of claim 5.

13. A decoder according to claim 11, wherein said prior statistical model has been generated by concatenating a plurality of sample sections of covertext, generating the log power spectrogram of the concatenated samples, and generating a covariance matrix (U') from the log power spectrogram, which matrix (U') transforms the mean local covariance matrix of the log power spectrogram of the samples into the identity matrix.

14. A decoder according to claim 13 and comprising a supplier which provides the prior sample matrix (U');
   a matrix generator which provides the result of matrix multiplication of the key or keys (K) with which the power spectrogram of the covertext was encoded with the prior sample matrix (U') to generate at least a matrix (U'K);
   a segment provider which provides successive segments (Y) of the power spectrogram of the covertext;
   a multiplier for multiplying each segment (Y) with said matrix (U') to generate matrices (U'Y); and
   a calculator which utilises Bayes theorem to derive from the respective matrices (U'Y) and (U'K) a sequence of values each representing the log ratio of the probability of a data bit if present being a "+1" or a "−1".

15. A decoder according to claim 14, comprising a first matrix multiplier for multiplying in the log domain the power spectrogram of the stegotext with said prior sample matrix (U') so as to generate a matrix (U'F);
   a segmenter which segments the matrix (U'F) into blocks (Y) corresponding in length and height to the key or keys K;
   an arithmetic unit for respectively adding and subtracting the matrix (U'K) to each block (Y) to generate (U'Y+U'K) and (U'Y−U'K);
   a generator which generates a scaled log determinant of each of the matrices (U'Y+U'K) and (U'Y−U'K); and
   a subtractor which subtracts the scaled log determinant of (U'Y+U'K) from (U'Y−U'K) to generate said series of values representing the log ratio of the probability of each data bit of interest being either a "−1" or a "+1".

16. A decoder according to claim 15, wherein said generator generates the log determinants of (U'Y+U'K) and (U'Y−U'K) and scales the respective log determinants with $$-\left(\frac{k+M}{2}\right),$$

where k represents the shape parameter of the Wishart distribution and M represents the number of columns in the key and wherein the or each key (K) is x columns wide and y bits high, and wherein the stegotext has been generated by adding or subtracting the or each key (K) to blocks (Y) of the stegotext in steps of T, where I is an integer number of columns of the key so that each key can be applied a plurality of times to each spectrogram block.

17. A decoder according to claim 13, wherein the matrix (U') represents a matrix ($B_0$ U'), in which ($B_0$) is a matrix which converts the matrix (U') to an orthogonal coordinate system which has fewer dimensions than the original coordinate system of (U').

18. An encoder for encoding a covertext signal to generate a stegotext, the encoder comprising:
   first transformation means for segmenting the covertext into overlapping segments and for carrying out a Fast Fourier Transform and rectangular polar conversion of the segmented covertext signal so as to transform the covertext signal into a log power spectrogram;
   means for providing at least one key in the form of a two-dimensional pattern of predetermined size;
   a multiplier for adding or subtracting in the log power spectrogram domain multiples of the key to blocks of the transformed covertext signal;
   means for controlling the addition or subtraction of the key by the multiplier in accordance with data representing a desired code; and
   second transformation means for carrying out polar rectangular conversion and inverse Fast Fourier Transformation of the modulated covertext signal so as to generate segments and to synthesise said segments to generate a stegotext.

* * * * *